United States Patent
Caldwell et al.

(10) Patent No.: US 11,565,709 B1
(45) Date of Patent: Jan. 31, 2023

(54) VEHICLE CONTROLLER SIMULATIONS

(71) Applicant: Zoox, Inc., Foster City, CA (US)

(72) Inventors: Timothy Caldwell, Mountain View, CA (US); Jefferson Bradfield Packer, San Francisco, CA (US); William Anthony Silva, San Francisco, CA (US); Rick Zhang, San Mateo, CA (US); Gowtham Garimella, Burlingame, CA (US)

(73) Assignee: Zoox, Inc., Foster City, CA (US)

( * ) Notice: Subject to any disclaimer, the term of this patent is extended or adjusted under 35 U.S.C. 154(b) by 712 days.

(21) Appl. No.: 16/555,988

(22) Filed: Aug. 29, 2019

(51) Int. Cl.
| | |
|---|---|
| *B60W 50/06* | (2006.01) |
| *B60W 50/04* | (2006.01) |
| *B60W 50/00* | (2006.01) |
| *G05B 13/02* | (2006.01) |
| *G06N 3/08* | (2006.01) |
| *G05B 13/04* | (2006.01) |

(52) U.S. Cl.
CPC ............ *B60W 50/06* (2013.01); *B60W 50/00* (2013.01); *B60W 50/045* (2013.01); *G05B 13/027* (2013.01); *G05B 13/042* (2013.01); *G06N 3/088* (2013.01); *B60W 2050/0075* (2013.01)

(58) Field of Classification Search
CPC .... B60W 50/06; B60W 50/00; B60W 50/045; G05B 13/027; G05B 13/042; G06N 3/088
USPC .............................................. 706/23; 701/23
See application file for complete search history.

(56) References Cited

U.S. PATENT DOCUMENTS

| | | | | |
|---|---|---|---|---|
| 2017/0286570 | A1* | 10/2017 | Kim | G06F 30/15 |
| 2019/0332110 | A1* | 10/2019 | Isele | G06N 3/006 |
| 2021/0001857 | A1* | 1/2021 | Nishitani | G06N 3/08 |

FOREIGN PATENT DOCUMENTS

JP    2018167705 A   * 11/2018

OTHER PUBLICATIONS

X. Ma, K. Driggs-Campbell and M. J. Kochenderfer, "Improved Robustness and Safety for Autonomous Vehicle Control with Adversarial Reinforcement Learning," 2018 IEEE Intelligent Vehicles Symposium (IV), 2018, pp. 1665-1671, doi: 10.1109/IVS .2018.8500450. (Year: 2018).*

* cited by examiner

*Primary Examiner* — Isaac G Smith
(74) *Attorney, Agent, or Firm* — Lee & Hayes, P.C.

(57) ABSTRACT

Techniques for generating simulations for evaluating a performance of a controller of an autonomous vehicle are described. A computing system may evaluate the performance of the controller to navigate the simulation and respond to actions of one or more objects (e.g., other vehicles, bicyclists, pedestrians, etc.) in a simulation. Actions of the objects in the simulation may be controlled by the computing system (e.g., by an artificial intelligence) and/or one or more users inputting object controls, such as via a user interface. The computing system may calculate performance metrics associated with the actions performed by the vehicle in the simulation as directed by the autonomous controller. The computing system may utilize the performance metrics to verify parameters of the autonomous controller (e.g., validate the autonomous controller) and/or to train the autonomous controller utilizing machine learning techniques to bias toward preferred actions.

20 Claims, 7 Drawing Sheets

VEHICLE CONTROLLER SIMULATIONS

BACKGROUND

Vehicles are increasingly supplementing or replacing manual functionality with automatic controls. Autonomous driving, however, requires robust computing systems capable of making split-second decisions to respond to myriad events and scenarios. Robustness of a computing system may be confirmed via physical tests, such as by driving the vehicle in multiple environments for extended periods of time and/or for numerous miles. However, physical testing has limits. For instance, performing physical tests among traffic and pedestrians may be unsafe. Moreover, it may be virtually impossible to exactly repeat physical tests, such as to evaluate different versions of operating software. Simulations may be used to evaluate operating software to confirm if the system behaves as expected (e.g., safely operates the vehicle to a destination).

The simulations may include objects that the vehicle may encounter in an environment. The number of objects, respective initialization variables, and behavior of the objects may be limited to a simulation programmer's experience and/or imagination. Due to this limitation, it may be difficult for the programmer to anticipate training simulations in which programmatic logic may not behave as intended. A limitation on the number of identified training simulations may limit an ability of the test system to determine logical flaws, or otherwise definitively make a statement about the efficacy of the operating software.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
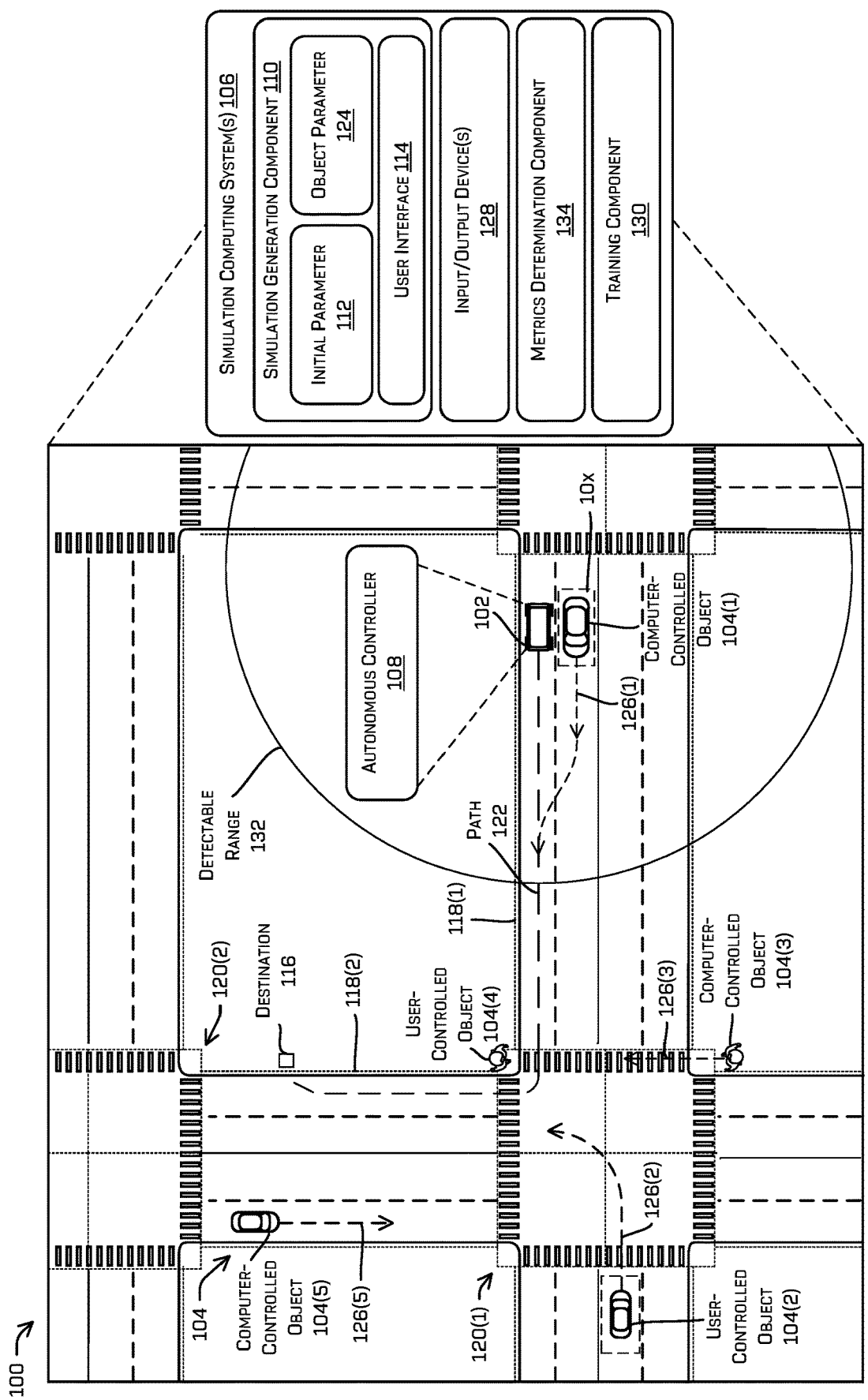
FIG. 1 is an illustration of an autonomous vehicle and multiple objects in a simulation in which a simulation system may be utilized to test autonomous vehicle control systems.

This disclosure is directed to techniques for generating simulations for evaluating performance of an autonomous controller of a vehicle in various environments. The autonomous controller may include a system configured to detect objects, determine an action for a vehicle to take to avoid the objects, and cause the vehicle to take the action. The evaluation of the autonomous controller may be used to confirm proper algorithmic behavior (e.g., expected behavior) and/or as a probe to change programmatic logic, etc. In various examples, the autonomous controller may control a vehicle (e.g., perform actions) in a simulation including one or more objects (e.g., other vehicles, bicyclists, pedestrians, etc.). In the simulation, the object(s) may be controlled based on user input and/or artificial intelligence input, such as by a computing system. In various examples, the object(s) may interact with the vehicle in the simulation to evaluate reactions of the autonomous controller (e.g., confirm if the system behaves as expected) while progressing toward an objective. The computing system may determine performance data (performance metrics) associated with the autonomous controller's ability to navigate the scenario (e.g., simulated vehicle actions responsive to the objects). The performance metrics may be used to verify particular parameters of the autonomous controller (e.g., validate the autonomous controller), such as in regression testing, and/or to train (e.g., modify) the autonomous controller utilizing machine learning techniques, such as reinforcement learning, to bias toward preferred actions. In some examples, training the autonomous controller may include modifying one or more parameters (e.g., vehicle parameters) associated with the autonomous controller. Thus, the techniques described herein may significantly improve the performance of the autonomous controller and greatly improve the safety of vehicle operations.

Although described herein with respect to simulating a response of an autonomous vehicle in an environment to one or more objects, policies, etc., the disclosure is not meant to be so limiting. In general, the techniques disclosed herein are equally valid for confirming whether or not programmatic logic of a system sufficiently accounts for all potential scenarios (ranges of initialization parameters), as well as enabling additional input to train such a system using, for example, reinforcement learning. As non-limiting examples, such techniques may be equally applicable, for example, with respect to power plant control, robotic manipulators, curing processes, etc., as well as any other system which uses programmatic logic for control.

In various examples, a computing system may generate a simulation with initialization parameters. The initialization parameters may represent an initial state of the simulated environment. In various examples, the initialization parameters may include road conditions (e.g., smooth surface, potholes, gravel road, etc.), weather conditions (e.g., rain, snow, sleet, fog, etc.), a starting point of the vehicle, a destination for the vehicle, a number of miles the vehicle travels to the destination, vehicle parameters (e.g., versions of an AI code, hardware and/or software associated with the vehicle, etc.), a number of objects present in the environment (e.g., within a threshold distance of the vehicle, overall, etc. and/or their respective positions, orientations, extents (size), velocities, accelerations, etc.), object density (e.g., number of pedestrians, cars, etc. per square mile, block, etc.), obstruction density (e.g., density of double parked vehicles, etc.), zoning (e.g., construction zone, school zone, etc.), particular sections of road (e.g., parsed from map data), or the like. In various examples, the computing system may generate simulations utilizing techniques described in U.S. patent application Ser. No. 16/376,842, filed Apr. 5, 2019 and entitled "Simulating Autonomous Driving Using Map Data and Driving Data," the entire contents of which are incorporated herein by reference.

The simulation may include one or more objects with which the vehicle (e.g., controlled by the autonomous controller) may interact while operating in the simulated environment. The objects may include static objects (e.g., buildings, bridges, signs, etc.) and/or dynamic objects such as other vehicles (e.g., cars, trucks, motorcycles, mopeds, etc.), pedestrians, bicyclists, or the like. In various examples, the objects may be controlled by the computing system (e.g., computer-controlled objects), such as utilizing artificial intelligence. Computer-controlled objects may be operated according to one or more object parameters. The object parameters may include a level of aggressive behavior (e.g., docile, aggressive, etc.), speed control (e.g., ranges of speeds, consistent speeds, maximum speeds, etc.), acceleration rates (e.g., forward, lateral, etc.), yaw rates (e.g., associated with turning maneuvers, etc.), or the like.

In various examples, the object parameters may be determined based on a classification associated with the object(s). A classification may include another vehicle (e.g., car, a pick-up truck, a semi-trailer truck, a tractor, a bus, a train, etc.), a pedestrian (e.g., walker, runner, etc.), a bicyclist, an equestrian, or the like. For example, a car may include a first set of object parameters, such as a first level of aggression and a first maximum speed, and a pedestrian may include a second set of object parameters, such as a second level of aggression and a second maximum speed. For another example, a first pedestrian classified as a walker may include a first set of object parameters (e.g., first maximum speed) while a second pedestrian classified as a runner may include a second set of object parameters (e.g., second maximum speed).

In various examples, the objects in the simulated environment may be controlled based on user input (e.g., user-controlled objects). The user input may be received via one or more input devices associated with a user interface of the computing system. The user interface may receive the input and may cause the object to change position and/or orientation according to the input. In various examples, the computing system may provide the user with one or more objectives for the simulation. The objective(s) may include a destination, a time to arrive at destination, a disruption to vehicle travel, or the like. In some examples, the user may receive rewards for satisfying one or more objectives in the simulation (e.g., trying to cause the autonomous vehicle to break one or more rules, or otherwise interfere with the planner logic of the autonomous vehicle in simulation). In some examples, computing system may limit the input associated with a user-controlled object, such as based on one or more object parameters. For example, an object may have associated therewith a maximum speed and regardless of the speed input above the maximum, the object will only travel the maximum speed. In various examples, such input may not be provided via user input, but another machine learned model (examples including adversarial networks, such as generative adversarial networks, or GANs).

In various examples, the user input received via the user interface may be utilized by the computing system to train the computer-controlled objects, such as by modifying one or more parameters (e.g., vehicle parameters) associated with the autonomous controller. In some examples, the computing system may process the user input to determine how a user may act and/or react in a particular scenario. In such examples, the computing system may utilize the user input as training data to train the computer-controlled objects, such as utilizing machine learning techniques. In at least some such examples, reinforcement learning may be utilized.

In various examples, the autonomous controller performance may be evaluated over multiple levels of a simulation. The different levels may represent increasing levels of difficulty (e.g., complexity) for the autonomous controller to control the vehicle to the destination, such as based on object interactions. In various examples, the object parameters may be modified based on a level of simulation, such that each level of the simulation may include different object parameters. For example, a first level of simulation may include a first set of object parameters with slower speeds and less aggressive behavior than a second set of object parameters associated with a second level of simulation.

In various examples, the computing system may evaluate the autonomous controller's performance with respect to an action performed by the vehicle in the simulation in response to an object. The action may include a maneuver (e.g., lane change, staying in a lane, going around an obstacle (e.g., double-parked vehicle, traffic cones, etc.), or the like), a speed variation (e.g., maintain velocity, accelerate, decelerate, etc.), positional variations (e.g., changing a position in a lane), or the like. For example, an action may include staying in a lane and adjusting a position of the vehicle in the lane from a centered position to operating on a left side of the lane, such as responsive to an object in an adjacent lane swerving toward the vehicle. In various examples, the computing system may evaluate the autonomous controller performance according to one or more metrics. The metric(s) may include an ability of the vehicle to identify an object (e.g., detect, classify, determine relevance, track, etc.), safety considerations (e.g., collisions (e.g., vehicle at-fault, vehicle not-at-fault, etc.), comfort considerations (e.g., lack of abrupt movements, lateral acceleration, longitudinal acceleration, etc.), progress considerations (e.g., time to destination), operational rules considerations (e.g., following rules of the road, regulations, driving laws, etc.), or the like. In various examples, the metrics may be determined based on a difference between data determined by the autonomous controller (e.g., autonomous controller determinations, perception data, etc.) and a ground truth corresponding to the simulation (e.g., actual representation of the environment and/or objects represented therein). In various examples, the metrics may be determined based on one or more rules. The rule(s) may include operating a minimum distance from an object, a maximum speed, maximum acceleration (e.g., lateral, longitudinal) not causing a collision (e.g., no at-fault collision), reaching a destination, or the like. In some examples, the metrics may represent a measure of how well the vehicle performs based on the rule(s).

In various examples, the computing system may associate the metrics with particular actions. In such examples, the computing may be configured to determine one or more high-performing actions (e.g., successful actions) for a particular scenario. In some examples, the computing system may be configured to determine an optimal action (e.g., best metrics) for a particular scenario. In various examples, the computing system may train the autonomous controller, such as utilizing machine learning techniques (e.g., reinforcement learning), to perform the optimal action in the scenario. In such examples, the computing system may cause the autonomous controller to bias toward high-scoring (e.g., successful) actions when it encounters a substantially similar scenario.

In various examples, the computing system may be configured to perform regression testing on an autonomous controller. In such examples, the computing system may evaluate the performance of a function (e.g., detecting, classifying, tracking objects, relevance determinations, etc.) of the autonomous controller to determine whether the function is operating as expected. In various examples, the evaluation may be based on one or more metrics associated with the function. For example, a software engineer may adjust algorithms and/or logic of an autonomous controller with regard to how a vehicle determines relevance of a detected object. The computing system may compare relevance data determined by the autonomous controller to ground truth data regarding relevance (e.g., such as based on pre-defined relevance criteria) to determine metrics associated with relevance determinations. The computing system may utilize the metrics to determine whether the vehicle performs as expected (e.g., identifies relevant objects).

In various examples, the computing system may run different versions of an autonomous controller on a particular simulation to determine an optimal version of the autonomous controller (e.g., best performing) or satisfactorily version of the autonomous controller (e.g., performing at or above a predetermined performance threshold). In some examples, the particular simulation may include substantially the same initialization parameters and/or object parameters. In some examples, the objects in the particular simulation may be computer-controlled objects. In some examples, the computer-controlled objects may be configured with substantially the same object parameters, such that a first object in a first version of the simulation may operate in substantially the same manner as the first object in a second version of the simulation. In some examples, the objects in the particular simulation may be controlled based on user input. In such examples, the computing system may store object data associated with the user input (e.g., object movements) and may recreate the particular simulation to evaluate the performance of a different version of the autonomous controller. For example, a first version of the autonomous controller may control a vehicle that detects, tracks, and responds to a user-controlled object in the simulated environment. The computing system may store data associated with movement of the user-controlled object in the simulated environment (e.g., such as with respect to the situation in which the autonomous controller responded to the user-controlled object). The computing system may generate a substantially identical simulation to the particular simulation to evaluate a performance of a second version of the autonomous controller detecting, tracking, and responding to the object.

In various examples, the computing system may determine the optimal version of the autonomous controller based on the performance metric(s). In various examples, the computing system may test a specific metric to determine a best performing autonomous controller with respect to the specific metric. For example, the two autonomous controllers, A and B, may include different control algorithms with regard to vehicle comfort (e.g., lack of abrupt movements). The computing system may run autonomous controllers A and B through a particular simulation (e.g., substantially the same simulation) to determine comfort metrics associated with each autonomous controller. The computing system may determine that autonomous controller A performs better than autonomous controller B (e.g., A is a best performing controller).

In various examples, the computing system may determine the optimal version of the autonomous controller based on two or more performance metrics. In some examples, the computing system may determine the optimal version based on an overall score associated with the two or more performance metrics. In some examples, each metric of the two or more metrics may be weighted differently to emphasize one metric over another. For example, safety metrics may be weighed more heavily than comfort and/or progress metrics, ensuring that an optimal version of the autonomous controller includes optimal safety protocols. In various examples, the computing system may identify the highest performing version of the autonomous controller for incorporation into an autonomous vehicle.

Additionally or in the alternative, a vehicle in the simulation may be controlled based on user input. In such an example, the user input may be substituted for the autonomous controller of the vehicle (e.g., input bypasses autonomous controller and directly controls the vehicle). In some examples, the user may be provided with a goal and one or more operating parameters of the vehicle. The user may provide input to react to the object(s) present in the environment, such as to avoid a collision therewith. In various examples, the user actions/reactions (e.g., user input associated with vehicle control) while operating the vehicle in the simulation may be used to train the autonomous controller, such as utilizing machine learning techniques. In such examples, the autonomous controller may be trained according to what a human may do in a given scenario.

The techniques discussed herein may improve the functioning of an autonomous vehicle in many ways. For example, the techniques discussed herein may provide dynamic and robust simulations with multiple objects for testing an ability of an autonomous controller to safely operate in the dynamic environment. For another example, the techniques described herein may readily validate the operation of an autonomous controller, such as after a software upgrade has been implemented. Additionally, the techniques described herein may provide a means by which a computing system may identify a version of an autonomous controller that operates at a higher performance level than other versions. The computing system may thus select the highest performing version for incorporation into a vehicle. As such, the techniques described herein may greatly improve safety of autonomous vehicle operations. For yet another example, the techniques described herein may reduce an overall number of simulations (e.g., fewer incrementally changed simulations) needed to evaluate and/or train an autonomous controller due to the varied nature of the simulations provided and increased relevance thereof to actual scenarios the autonomous controller may encounter in an environment. The reduced number of simulations may thus reduce a load on a processor of the computing system and/or increase an amount of memory available for other data.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In one example, similar techniques may be utilized in driver-controlled vehicles in which such a system may provide an indication of whether it is safe to perform various maneuvers. In another example, the techniques may be utilized in an aviation or nautical context, or in any system using planning techniques.

FIG. 1 is an illustration of an autonomous vehicle 102 and multiple objects 104 in a simulation 100 in which a simulation computing system 106 may be utilized to evaluate and train an autonomous vehicle control system 108 (e.g., an autonomous controller 108). In various examples, one or more of the functions of the simulation computing system 106 may be performed by one or more computing devices 434 of FIG. 4 and/or one or more vehicle computing devices 404 of FIG. 4.

In various examples, a simulation generation component 110 of the simulation computing system 106 may receive one or more initialization parameters 112 (e.g., initial parameter 112). The initial parameters 112 may represent an initial state of the simulation 100. In various examples, the initial parameters 112 may include road conditions (e.g., smooth surface, potholes, gravel road, etc.), a map topography, weather conditions (e.g., rain, snow, sleet, fog, etc.), a starting point of the vehicle, a destination for the vehicle, a number of miles the vehicle travels to the destination, vehicle parameters (e.g., versions of an AI code, hardware and/or software associated with the vehicle, etc.), a number of objects present in the environment (e.g., within a threshold distance of the vehicle, overall, etc.) and/or their respective states, object density (e.g., number of pedestrians, cars, etc. per square mile, block, etc.), obstruction density (e.g., density of double parked vehicles, etc.), zoning (e.g., construction zone, school zone, etc.), particular sections of road (e.g., parsed from map data), or the like.

In various examples, the simulation generation component 110 may receive the initial parameters 112 as input, such as via a user interface 114. In such examples, a user may determine the initial parameters 112. For example, a user (e.g., software engineer) may modify code of an autonomous controller with respect how vehicle 102 performs in the rain. The user may thus set an initial parameter 112 to simulate rain in the simulation 100. In some examples, any one or more such parameters may be randomly modified upon instantiation.

In some examples, simulation generation component 110 may determine the initial parameters 112. In various examples, the initial parameters 112 may be selected to perform regression testing on one or more vehicle parameters of interest, such as a vehicle parameter that has recently undergone an update. In such examples, the simulation computing system 106 may be configured evaluate the performance of the parameter(s) associated with a function (e.g., detecting, classifying, tracking objects, relevance determinations, etc.) of the autonomous controller 108 to determine whether the function (e.g., parameter) is operating as expected. In some examples, the simulation generation component 110 may determine the initial parameters 112 based on the vehicle parameter(s) and/or function(s) associated therewith to be evaluated and/or trained. In such examples, the simulation generation component 110 may determine the vehicle parameter(s) and/or function(s) to be evaluated and/or trained based on an input from a user and/or based on a pre-determined testing schedule. For example, after a software update to a perception system of an autonomous controller 108 and prior to incorporation into a vehicle, a software engineer may input a command for the simulation computing system 106 to test an instantiation of the updated autonomous controller 108 to verify a level of performance with respect to identifying and avoiding static obstacles. The simulation generation component 110 may determine the initial parameters 112 to test the level of performance of the autonomous controller 108 to detect and avoid the static obstacles.

In some examples, the simulation generation component 110 may select a random set of initial parameters 112 for the simulation 100. In such examples, the simulation generation component 110 may be configured to evaluate the ability for the autonomous controller to operate the vehicle 102 in randomly generated scenarios.

In various examples, the simulation computing system(s) 106 may be configured to evaluate the ability for the autonomous controller 108 to operate the vehicle 102 across multiple levels of the simulation 100. The different levels may represent increasing levels of difficulty (e.g., complexity) for the autonomous controller 108 to control the vehicle to a destination 116. In such examples, the initial parameters 112 may be determined based on a level associated with the simulation 100. For example, the initial parameters 112 associated with a first level of the simulation 100 may include a smooth road surface with limited traffic density, and a tenth level of the simulation 100 may include a road surface with occasional potholes and moderate traffic density and heavy pedestrian density.

In various examples, the initial parameters 112 may include one or more drivable surfaces 118 (e.g., road segments) over which the autonomous controller 108 may control the vehicle 102. In various examples, the drivable surface(s) 118 may represent actual road segments, such as based on map data as described in U.S. patent application Ser. No. 16/376,842 incorporated by reference herein above. The map data may include map data of one or more drivable surfaces 118 on which one or more autonomous vehicles have been operating and a surrounding environment. The map data may include detailed maps used by one or more autonomous vehicles to travel through a geographic area along the drivable surface(s) 118, for example, utilizing simultaneous localization and mapping (SLAM) techniques, though SLAM techniques may or may not be utilized in simulations. By way of non-limiting example, the map data may include a 3D mesh of the drivable surfaces and/or of the geographic area including the drivable surface(s), as well as aspects about the drivable surface(s), including but not limited to extents of the drivable surface(s) 118, road marking information, road surfaces including potholes and/or bumps, or the like. In the illustrative examples, the drivable surface(s) 118 may include a number of road segments including a first drivable surface 118(1) (e.g., road segment 118(1)) and a second drivable surface 118(2) (e.g., road segment 118(2)), and a number of intersections, including a first intersection 120(1) and a second intersection 120(2). In various examples, the autonomous controller 108 may determine a path 122 for the vehicle 102 to travel to the destination 116. In the illustrative example, the path 122 may include the first drivable surface 118(1), the first intersection 120(1), and the second drivable surface 118(2). Though this is not intended to be limiting, and the path 122 may encompass a greater or lesser number of road segments and/or intersections.

In various examples, the simulation generation component 110 may generate the simulation 100 based on the initial parameters 112. Additionally, and as illustrated, the simulation 100 may include one or more objects 104 with which the vehicle 102 (e.g., controlled by the autonomous controller 108) may interact while operating in the simulation 100. The objects 104 may include other vehicles (e.g., cars, trucks, motorcycles, mopeds, etc.), pedestrians, bicyclists, or any other dynamic object configured to operate on a drivable surface 118. Though illustrated as cars 104(1), 104(2), and 104(5) and pedestrians 104(3) and 104(4), different classifications and/or combinations of objects 104 are contemplated herein.

In various examples, the objects 104 may be controlled by the simulation computing system 106 (e.g., computer-controlled objects 104), such as utilizing artificial intelligence. Computer-controlled objects 104, such as objects 104(1), 104(3), and 104(5), may be operated according to one or more object parameters 124. The object parameter(s) 124 may include a level of aggressive behavior (e.g., docile, aggressive, etc.), speed control (e.g., ranges of speeds, consistent speeds, maximum speeds, etc.), acceleration rates (e.g., forward, lateral, etc.), yaw rates (e.g., associated with turning maneuvers, etc.), or the like. In some examples, the objects 104 in a simulation 100 may include the same or different object parameter(s) 124. For example, the object 104(1) may have associated therewith an aggressive level of behavior and the object 104(5) may include a docile level of behavior. In some examples, the simulation computing system 106 may limit a number of aggressive and/or docile objects 104 present in a simulation 100. In such examples the number of aggressive and/or docile objects 104 may be based on real data, such as based on perception data captured by the one or more vehicles that have been operating in a real environment corresponding to the simulation 100.

In various examples, the object parameter(s) 124 associated with a particular object 104, such as computer-controlled object 104(3) may be based on a classification associated with the object 104(4). A classification may include another vehicle (e.g., car, a pick-up truck, a semi-trailer truck, a tractor, a bus, a train, etc.), a pedestrian (e.g., walker, runner, etc.), a bicyclist, an equestrian, or the like. For example, an object 104(3) may be classified as walking pedestrian. Based on the classification as a walking pedestrian, the object 104(3) may include a set of object parameters including a maximum speed of 3 miles per hour, a maximum forward acceleration of 4 feet per second$^2$, and the like. For another example, the object 104(3) may be classified as a running pedestrian. Based on the classification as a running pedestrian, the object 104(3) may include a set of object parameters including a maximum speed of 10 miles per hour, a maximum acceleration of 8 feet per second$^2$.

In various examples, the simulation computing system 106 may control the computer-controlled objects 104(1), 104(3) and 104(5) according to one or more respective trajectories 126(1), 126(3), and 126(5). The trajectories 126(1), 126(3), and 126(5) may represent a velocity (e.g., direction and speed), acceleration (positive, negative, lateral), yaw rate, associated with movement of the respective objects 104(1), 104(3) and 104(5). In some examples, the trajectories 126(1), 126(3), and 126(5) may be determined based on the respective interactions with the vehicle 102 in the simulation 100, such as to test a response of the autonomous controller 108 thereto. For example, the simulation computing system 106 may have an objective to test an autonomous controller 108 reaction to being cut-off. The simulation computing system may determine the trajectory 126(1) to include forward and lateral accelerations resulting in the object 104(1) cutting off the vehicle 102.

In various examples, the simulation computing system 106 may determine an object destination associated with each object. In such examples, the trajectories 126(1), 126 (3), and 126(5) may be determined based on a path between an initial position and the object destination. In some examples, the simulation computing system 106 may additionally set a time to reach the object destination. In such examples, the trajectories 126(1), 126(3), and 126(5) may be based on the time to reach the object destination. In various examples, the simulation 100 may include a re-creation of a real environment in which a vehicle 102 previously operated. In such examples, the trajectories 126(1), 126(3), and 126(5) may be determined based on perception data captured by one or more sensors of the vehicle 102, such as one or more paths a detected and tracked objects corresponding to computer-controlled objects 104(1), 104(3), and 104(5) actually traveled through the environment.

In various examples, the simulation computing system 106 may control the objects 104 along the trajectories 126(1), 126(3), and 126(5) utilizing artificial intelligence (AI). In some examples, the AI may be used to control the objects 104(1), 104(3), and 104(5) according to object parameters 124, rules of the road, regulations, laws, speed limits, objectives (e.g., object destination, time to destination, etc.), and the like. In various examples, the simulation computing system 106 may train the AI utilizing perception data captured by sensors on vehicles in an environment (e.g., real data). In such examples, the simulation computing system 106 may train the AI utilizing machine learning techniques to determine one or more trajectories 126(1), 126(3), and 126(5) and/or to control the respective objects 104(1), 104(3), and 104(5) in a scenario. In various examples, a training component 130 of the simulation computing system 106 may train the AI based on user inputs associated with user-controlled objects 104(2) and 104(4). In such examples, the training component may process the user input to determine how a user may act and/or react in a particular scenario. The training component 130 may utilize the user input as training data to train the computer-controlled objects 104(1), 104(3), and 104(5), such as utilizing machine learning techniques. In various examples, the user input may represent actions that one or more human-operators may perform in an environment with the vehicle 102 (e.g., actions that are adverse to the vehicle 102). In at least one example, the user input may include an aggressive action of a human-operated object that the vehicle 102 may encounter in the environment. In such an example, by training the computer-controlled objects 104(1), 104(3), and 104(5) with the user input, the autonomous controller 108 may be tested in simulations comprising "worst-case" adversarial situations. As such, the autonomous controller 108 may be adept at responding to adversarial objects, thereby enhancing the safe operation of the vehicle 102. In some examples, the adversarial objects may together form an adversarial network of objects configured and/or trained to challenge the vehicle in adverse situations.

In various examples, the objects 104 in the simulation 100 may be controlled based on user input (e.g., user-controlled objects 104(2) and 104(4)). In some examples, the user input may be received via one or more input/output devices 128 associated with the user interface 114 of the simulation computing system 106. In other examples, the user input may be received from a remote computing device, such as via an instance of the user interface 114 on a user computing device. The user interface 114 may receive the input and may cause the user-controlled object 104 to change position and/or orientation according to the input. In various examples, the simulation computing system 106 may provide the user with one or more objectives for the simulation. The objective(s) may include an object destination, a time to arrive at destination, a disruption to vehicle travel, causing the vehicle to violate one or more rules or policies, or the like. In some examples, the user may receive rewards for satisfying one or more objectives in the simulation. In some examples, simulation computing system 106 may limit the input associated with a user-controlled object 104(2) and/or 104(4), such as based on one or more object parameters 124. For example, the object parameters 124 associated with user-controlled object 104(2) may include a maximum acceleration and a maximum yaw rate. The trajectory 126(2) may thus be limited to the maximum acceleration and the maximum yaw rate, regardless of user input with regard to the acceleration into the first intersection 120(1) and rate associated with the left turn.

In various examples, the simulation computing system 106 may be configured to receive inputs from a single user. In some examples, the user interface 114 may be configured to receive inputs from a user with regard to one or more user-controlled objects 104(2) and/or 104(4). Though illustrated as two user-controlled objects 104(2) and 104(4), the user interface 114 may be configured to receive input with regard to a greater number of objects 104 controlled by a single user. In various examples, the simulation computing system 106 may be configured to receive inputs from multiple users. In such an example, a first user may control the first user-controlled object 104(2) and a second user may control the second user-controlled object 104(4).

Though simulation 100 of FIG. 1 includes three computer-controlled objects 104(1), 104(3), and 104(5), and two user-controlled objects 104(2) and 104(4), this is merely for illustrative purposes, and a greater or lesser number of computer and/or user-controlled objects 104 may be contemplated. For example, a simulation may include 20 computer-controlled objects 104 and zero user-controlled objects 104. For another example, a simulation may include 10 user-controlled objects 104 and zero computer-controlled objects 104.

As discussed above, the simulation computing system(s) 106 may be configured to evaluate the ability for the autonomous controller 108 to operate the vehicle 102 across multiple levels of the simulation 100. The different levels may represent increasing levels of difficulty for the autonomous controller 108 to control the vehicle 102 to the destination 116. In various examples, the different levels may permit more aggressive inputs by the user. In such examples, for each subsequent level (e.g., 2, 3, 4, etc.), the user may be able to control the user-controlled objects 104(2) and 104(4) at increasingly greater maximum speeds, acceleration rates (e.g., lateral and longitudinal), yaw rates, etc. In some examples, for each subsequent level, the simulation may include a greater density of computer-controlled objects and/or user-controlled objects 104.

In various examples, the simulation computing system(s) 106 may execute the simulation 100 (e.g., run the simulation 100), whereby the vehicle 102 and the objects 104 may progress toward respective objectives. In various examples, the autonomous controller 108 may determine the path 122 for the vehicle 102 to take to the destination 116. In some examples, the path 122 may represent an initial path that, absent interaction with objects 104 and/or other obstacles, the vehicle 102 would take.

In various examples, the autonomous controller 108 receive simulated sensor data (e.g., data representative of the simulated environment) and may detect the objects 104 and determine the one or more trajectories based on the objects 104. In various examples, the autonomous controller 108 may be configured to detect objects 104, such as object 104(1) within a detectable range 132. The detectable range 132 may be determined based on a distance (e.g., 100 feet, 100 meters, etc.) from the vehicle 102 that sensor data may include usable data (e.g., capable of providing relevant information, etc.). In various examples, the autonomous controller 108 may be configured to determine a classification associated with the object 104(1) (e.g., another vehicle (e.g., car, a pick-up truck, a semi-trailer truck, a tractor, a bus, a train, etc.), a pedestrian (e.g., walker, runner, etc.), a bicyclist, an equestrian, etc.) based on the simulated sensor data.

In various examples, the autonomous controller 108 may be configured to determine one or more trajectories 126(1) associated with the object 104(1). The trajectories 126(1) may be determined using a probabilistic heat map (e.g., discretized probability distribution) to predict object 104(1) behavior, such as that described in U.S. patent application Ser. No. 15/807,521, filed Nov. 8, 2017, and entitled "Probabilistic Heat Maps for Behavior Prediction," the entire contents of which are incorporated herein by reference. In some examples, the one or more predicted trajectories may be based on a top-down representation of an environment, such as by utilizing the techniques described in U.S. patent application Ser. No. 16/151,607 filed Oct. 4, 2018 and entitled "Trajectory Prediction on Top-Down Scenes," and in U.S. patent application Ser. No. 16/504,147 filed Jul. 5, 2019 and entitled "Prediction on Top-Down Scenes based on Action Data," the entire contents of both of which are incorporated herein by reference. In various examples, the one or more predicted trajectories may be determined utilizing tree search methods, temporal logic formulae, and/or machine learning techniques.

In various examples, the autonomous controller 108 may identify one or more actions the vehicle 102 could take (e.g., vehicle action), such as based on the object trajectory 126(1) (e.g., responsive to the object 104(1)). As used herein, a vehicle action may include a simulated action the autonomous controller 108 causes the vehicle to take in the simulation (e.g., simulated vehicle action). The action may include a maneuver (e.g., lane change, staying in a lane, going around an obstacle (e.g., double-parked vehicle, traffic cones, etc.), etc.), a speed variation (e.g., maintain velocity, accelerate, decelerate, etc.), positional variations (e.g., changing a position in a lane), or the like. In the illustrative example, a first action may include staying in a lane and slowing down to increase a distance between the object 104(1) and the vehicle 102 when the object 104(1) changes lanes and a second action may include accelerating to advance in front of the object 104(1) to prevent the object 104(1) from changing lanes in front of the vehicle 102.

In various examples, the autonomous controller 108 may determine an action of the one or more actions for the vehicle 102 to take and the vehicle 102 may progress forward in the simulation 100 based on the action. In various examples, a metrics determination component 134 of the simulation computing system(s) 106 may determine one or more performance metrics (e.g., metrics) associated with the performance of the autonomous controller 108 in the scenario with the object 104(1). In some examples, the performance metrics may represent the performance of a perception system associated with the autonomous controller. In such examples, the performance metrics may represent an ability of the perception system to identify and track the object 104(1) (e.g., detect, classify, determine relevance, track, determine trajectories 126(1), etc.). In some examples, the performance metrics may include precision and recall. The precision may include the number of tracks that were tracked accurately versus the total number of tracks across the entire data. The recall may include a percentage of objects that the perception system identified as an object that needed to be tracked. The precision and/or recall may be associated with a classification of the object 104(1) or not. For example, the performance metrics may include the autonomous controller precision and recall associated with pedestrians. In various examples, the metrics determination component 134 may determine metrics associated with the autonomous controller 108 utilizing the techniques described in U.S. patent application Ser. No. 16/530,515, filed Aug. 2, 2019, and entitled "Relevant Object Detection," the entire contents of which are incorporated herein by reference. In such examples, the metrics may be determined based on a difference between data determined by the autonomous controller 108 (e.g., autonomous controller 108 determinations, perception data, etc.) and a ground truth corresponding to the simulation (e.g., actual representation of the environment and/or objects represented therein).

In some examples, the performance metrics may represent costs associated with the selected action based on one or more factors, such as a safety factor (e.g., at-fault collisions (e.g., vehicle fault), a comfort factor (e.g., lack of abrupt movements), a progress factor (e.g., average time to destination, delays caused by the action), an operational rules factor (e.g., following rules of the road, regulations, driving laws, etc.), or the like. In such examples, the metrics may be determined based on costs associated with each factor. A safety cost associated with the safety factor may be based on a distance between the object and the vehicle being less than a minimum distance. In some examples the safety cost may be based on an occurrence of a vehicle-fault collision between the vehicle and the object in the simulation. In such examples, the safety cost may be determined based on the vehicle action and/or a failure to perform an action to avoid the collision (e.g., accelerate, decelerate, change position (e.g., lane change, position in a lane, etc.), etc.).

In various examples, a comfort cost associated with the comfort factor may include an object comfort cost and/or a vehicle comfort cost. The object comfort cost may include a lack of abrupt movements of the object responsive to a vehicle action (e.g., vehicle trajectory associated with the vehicle action). The vehicle comfort cost may include a lack of abrupt movements of the vehicle associated with the vehicle action. The abrupt movements may include a positive acceleration, negative acceleration (e.g., longitudinal acceleration), and/or a lateral acceleration (e.g., jerk). In various examples, the comfort cost may be based on a determination that the acceleration exceeds a maximum acceleration (e.g., threshold lateral and/or longitudinal (e.g., positive, negative, etc.) acceleration). In some examples, the comfort cost may be based on a minimum distance between the vehicle and the object in the simulation, such as while the vehicle performs the vehicle action and the object performs the object action.

In various examples, a progress cost associated with the progress factor may be based on a delay resulting from the vehicle action and/or the object action. In some examples, the progress cost may be proportional to a number of seconds of delay result from vehicle action and/or the object action. In some examples, the delay may be determined based on a nominal velocity profile of the vehicle and/or the object. The nominal velocity profile may include a baseline velocity profile that the vehicle and/or the object would take through the simulated environment. In some examples, the delay may be determined based on a baseline time to destination calculated based on the baseline velocity profile.

In some examples, an operational rules cost may be based on rules of the road (e.g., department of transportation laws, codes, regulations, etc.), rules of good driving, regional driving habits (e.g., common driving practices), driving courtesies (e.g., adjusting a position in a lane to provide space for another car to pass for a right-hand turn, not occupying a bike lane, etc.). In various examples, the operational rules cost associated with an action (e.g., vehicle action, object action) may be calculated based on one or more rules that are broken and/or satisfied. In such examples, the operational rules cost may be increased based on rules (e.g., rules, habits, courtesies, etc.) that are broken or unfulfilled and/or decreased based on rules that are satisfied or fulfilled.

In some examples, the costs (e.g., performance metrics) may be determined based on a vehicle trajectory and the object trajectory 126, such as described in U.S. patent application Ser. No. 16/539,928, filed Aug. 13, 2019, and entitled "Cost-Based Path Determination," the entire contents of which are incorporated herein by reference. In some examples, the action may incur penalties for undesirable actions and rewards for desirable actions. For example, the first action described above in which the vehicle 102 slows down to increase a distance between the object 104(1) and the vehicle 102 as the object 104(1) changes lanes may incur a penalty due to the deceleration (progress cost) and a reward due to the safe action (safety cost).

In various examples, the metrics determination component 134 may determine action costs associated with each action the vehicle 102 takes throughout the simulation 100. In some examples, the metrics determination component 134 may identify actions that resulted in the lowest costs (e.g., best actions) for a given scenario. In some examples, the metrics determination component 134 may provide the actions associated with the best actions to the training component 130 to bias an instantiation of the autonomous controller 108 toward the best performing actions, such as utilizing machine learning techniques. In such examples, the autonomous controller 108 may be trained to perform (bias toward) the best performing actions while operating. In some examples, the training component 130 may modify one or more parameters (e.g., vehicle parameters) associated with the autonomous controller 108 to bias toward the preferred action.

In some examples, the metrics determination component 134 may determine a performance metric is associated with a performance is equal to or above a threshold performance level. In some examples, the threshold performance level may be associated with a threshold cost corresponding to safe, comfortable, and/or efficient actions. In various examples, the bias toward the best performing actions may improve safety and efficiency in vehicle 102 operation. Additionally, the bias toward the best performing action may reduce a number of calculations and potential actions the autonomous controller 108 and/or a vehicle computing device may have to compute. As such, the bias toward the best performing action may improve the functioning of the autonomous controller 108 and/or the vehicle computing device.

In some examples, the threshold performance level may correspond to a minimum performance of the autonomous controller to process object 104 data (e.g., detect, classify, determine relevance, determine trajectories 126, track, etc.). In such examples, the simulation computing system 106 may be configured to identify faults and/or well performing aspects of an autonomous controller 108.

As will be discussed in further detail below with regard to FIG. 3, multiple versions of the autonomous controller 108 may evaluated using the simulation 100. In some examples, the simulation computing system 106 may control the objects 104 and object movements (e.g., object trajectories 126) to be substantially the same from one instantiation of the simulation 100 testing a first version of the autonomous controller to a second instantiation of the simulation 100. In such examples, different versions of the autonomous controller 108 may be evaluated against substantially the same simulation 100 to determine a best performing controller. In various examples, the best performing controller may be incorporated into a vehicle 102 for real-time operation. The identification and incorporation of the best performing controller may greatly improve the functionality of the vehicle computing device and may maximize safety with regard to vehicle 102 operation.

As will be discussed in further detail below with regard to FIG. 6, one or more parameters of the autonomous controller 108 may be modified based on performance of the autonomous controller. In some examples, the autonomous controller 108 may be controlled utilizing reinforcement learning. In such examples, the parameter(s) may be incrementally modified based on the performance metrics until a threshold performance with respect to the parameter (s) is reached. In various examples, the performance metric may include a cost associated with the performance of the autonomous controller 108. In such examples, the cost may be associated, at least in part, with the parameter(s), such that a modification of the parameter(s) may change the cost.

Additionally, or in the alternative, a vehicle 102 may be controlled based on user input, such as in lieu of the control inputs received from the autonomous controller 108. In some examples, the user input may be received via one or more input/output devices 128 associated with the user interface 114 of the simulation computing system 106. In other examples, the user input may be received from a remote computing device, such as via an instance of the user interface 114 on a user computing device. The user interface may receive the input and may cause the vehicle 102 to change position and/or orientation according to the input, such as in lieu of the autonomous controller 108. In various examples, the simulation computing system 106 may provide the user with one or more objectives for the vehicle in the simulation. The objective(s) may include an object destination, a time to arrive at destination, a disruption to vehicle travel, or the like. In some examples, the user may receive rewards for satisfying one or more objectives in the simulation. In some examples, simulation computing system 106 may limit the input associated with the vehicle 102. In such examples, the simulation computing system 106 may prevent the user from causing the vehicle 102 to exceed a maximum speed, acceleration, yaw rate, or the like. In some examples, the limitations on user input associated with the vehicle 102 may be based on a maximum level of aggressive behavior that the vehicle 102 is allowed to perform. In such examples, the simulation computing system 106 may prevent the user from causing the vehicle 102 to exceed the maximum level of aggressive behavior.

In various examples, the training component 130 may utilize user input controlling the vehicle 102 to train the autonomous controller 108, such as via machine learning techniques. In such examples, the user input may be used as training data to influence the autonomous controller 108 to control the vehicle 102 in a manner similar to what a human may do. In various examples, the training component 130 may filter user input that result in high rewards, low costs, or the like (e.g., high performing actions) to train the autonomous controller. In some examples, the user input used as training data may include actions associated with rewards above a threshold reward, costs below a threshold costs, penalties below a threshold penalty, or the like. In some examples, the user input used as training data may be limited in a level of aggression (e.g., maximum acceleration (lateral and longitudinal), maximum yaw rate, distance maintained from objects, etc.). In such examples, the training component 130 may filter out data corresponding to input (e.g., actions) with a level of aggression above a threshold level (e.g., acceleration above a threshold, yaw rate above a threshold yaw rate, less than a minimum distance from an object/obstacle, etc.). In various examples, the filtering of data may ensure that the training component 130 consistently trains the autonomous controller 108 to perform actions that are safe, comfortable, and improve performance of the vehicle 102 in satisfying an objective.

Figure 2:
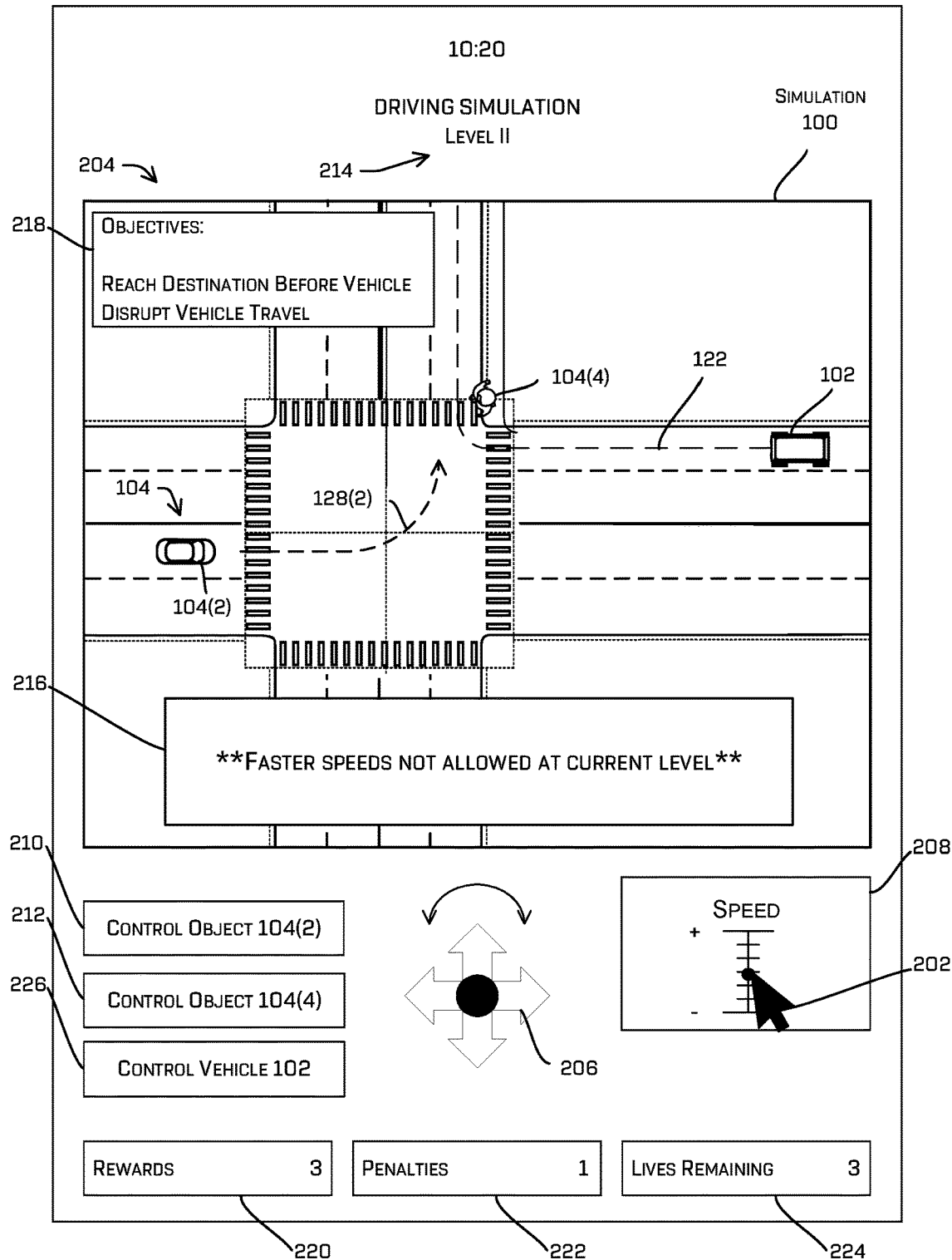
FIG. 2 is an example user computing device in which a user may control one or more objects in a simulation via a user interface.

FIG. 2 is an example user computing device 200 in which a user 202 may control one or more objects 104, such as user-controlled objects 104(2) and 104(4), in a simulation 100 via a user interface 204, such as user interface 114. In various examples, the user interface 204 may be associated with a driving simulation application (e.g., web-enabled, web-based application, offline application, etc.) installed on the user computing device 200. In various examples, data corresponding to vehicle 102 movement (e.g., representations of autonomous controller 108 input, etc.) and/or object 104(2), 104(4) movement (e.g., the input via the user interface 204) may be transmitted between the user computing device 200 and another computing device, such as simulation computing device(s) 106.

In various examples, the user-controlled objects 104(2) and 104(4) may be controlled by the user 202, based on one or more inputs via the user interface 204. In the illustrative example, the user interface 204 includes a directional controller 206 and a speed controller 208. In various examples, the directional controller 206 may be configured to receive input corresponding to lateral and/or longitudinal movement. In some examples, the directional controller 206 may be configured to receive input associated with a yaw rate of the object 104(2) and/or 104(4). In some examples, the speed controller 208 may provide a means by which the user 202 may increase or decrease the speed of the object 104(2) and/or 104(4). In various examples, the input via the directional controller 206 and/or the speed controller 208 may result in the trajectory 126 associated with the object 104, such as trajectory 126(2) associated with object 104(2). In various examples, the speed controller 208 may include a maximum and/or minimum speed (e.g., one or more speed constraints) associated with the objects 104(2) and or 104(4). In such examples, the user 202 may be precluded from causing or attempting to cause the objects 104(2) and/or 104(4) from exceeding the speed constraint(s).

In some examples, the directional controller 206 and the speed controller 208 may be incorporated together in a single controller. For example, a time in which the user 202 selects a direction may increase speed in that direction proportionately. In some examples, directional controller 206 and/or the speed controller 208 may include one or more input/output devices coupled (e.g., via a wired and/or wireless connection) to the user computing device 200. For example, the user interface 204 may have associated therewith a joystick (input device). The joystick may be configured to control the direction and speed of the objects 104(2) and/or 104(4). Although illustrated as controllers on and/or coupled to the user computing device 200, this is merely for illustrative purposes, and any other type of controller is contemplated. For example, the simulation 100 may be presented on the user computing device 200 via a touch screen display configured to receive input with regard to directional and/or speed control of the objects 104(2) and/or 104(4). In such an example, the user 202 may select the object 104(2) for movement and may adjust a position and/or speed associated therewith by dragging a finger and/or cursor across the display, resulting in trajectory 126(3).

In the illustrative example, the user interface 204 may include object control selections 210 and 212 to toggle between control of two (or more) objects. In such an example, a single user 202 may be capable of controlling two or more objects 104 in the simulation 100. As illustrated, the object control selection 210 may represent control of object 104(2), such that when the object control selection 210 is selected, the directional controller 206 and the speed controller 208 modify the direction and speed of the object 104(2) and likewise for object control selection 212 and direction and/or speed control of the object 104(4). In other examples, the user 202 may toggle between objects 104(2) and 104(4) by selecting the respective object 104, such as on a touch screen, and inputting directional and/or speed control associated with the selected object 104.

In various examples, the user 202 may be limited to control of a single object 104, such as 104(2), in a simulation. In such examples, the directional controller 206 and the speed controller 208 may be associated with the direction and speed of the single object 104(2). In examples in which the user 202 is limited to control of a single object 104(2) at a time, another user and/or a computer, such as simulation computing device 106 may control other objects 104 in the simulation, such as 104(4). In multi-user examples, the respective user computing devices and/or simulation computing device may be configured to transmit and receive vehicle 102 and/or object 104 movement data.

In various examples, one or more limitations (e.g., speeds, yaw rates, single object control, multiple object control, etc.) with regard to user input may be determined based on a level 214 associated with the simulation 100 (illustrated as Level II). In such examples, each level 214 may be associated with maximum speeds, accelerations, yaw rates, number of objects to control, and the like. In various examples, responsive to determining that the user 202 is attempting to operate outside of the limitation(s) of the level 214, the user computing device 200 may cause a notification 216 to surface via the user interface 204. The notification 216 may include information regarding the limitation(s), an encouragement to advance in levels to permit more aggressive behavior, or the like. For example, as illustrated, the simulation 100 presented on the user interface 204 is at level II. The user 202 attempts to increase speed via the speed controller 208, and the user computing device 200 surfaces the notification 216 indicating to the user 202 that faster speeds are not allowed at the current level (object 104 is operating at maximum speed). Additionally or in the alternative, responsive to determining that the user 202 is operating outside of the limitation(s) (or attempting to) the user computing device 200 may assess a penalty for exceeding a limitation, such as depicted as penalty 222.

In various examples, the limitation(s) may be associated with a maneuver (e.g., lane change, left turn, right turn, etc.). In such examples, the maneuvers may have associated therewith maximum speeds, yaw rates, accelerations, etc. For example, the user 202 may try to increase the speed of the object 104(2) turning left in front of the vehicle 102, such as to be able to turn in front of the vehicle 102. However, the left turn may have associated therewith a maximum speed. Based on an attempt to increase speed in the left turn above the maximum allowed, the user computing device 200 may cause the notification 216 to surface via the user interface 204, indicating that an increase in speed is not authorized.

In various examples, the user interface 204 may present one or more objectives 218 to the user 202. In some examples, the objective(s) 218 may be presented to one or more users 202 in an adversarial network. In such examples, the one or more users 202 may each control one or more objects 104 (user-controlled objects) with the intent to disrupt or otherwise act in an adversarial manner toward the vehicle 102. The objective(s) 218 may include one or more goals for the object 104 to achieve. In various examples, the objective(s) 218 may provide a means by which the object 104 may be assessed rewards 220 and penalties 222. For example, a reward 220 may be granted for a maneuver that resulted in the vehicle 102 slowing down and causing a delay. Though illustrated as objective(s) 218 that correspond to the vehicle 102, the objective(s) 218 may include goals independent of the vehicle 102 and/or vehicle 102 travel.

In some examples, the amount of a reward 220 and/or penalty 222 may be based on a level of the objective achieved (or not for a penalty 222). For example, a first maneuver may result in a 2 second delay of the vehicle, resulting in a reward 220 of 2, whereas a second maneuver may result in a 3 second delay of the vehicle 102, resulting in a reward 220 of 3. In various examples, a maneuver that does not result in any delay or disruption to the vehicle 102 may result in a penalty 222. In some examples, a maneuver that is unsafe, uncomfortable for a simulated passenger of the object 104, or violates an operational rule of the road (e.g., laws, regulations, good driving etiquette, etc.) may result in a penalty 222. For example, the user 202 may control the object 104(2) to turn left into a right-hand lane, blocking the vehicle 102 from turning right along the path 122. Because the object 104(2), according to the rules of good driving etiquette, should have turned left into the left-hand lane, the user may incur a penalty of 2 while also being awarded a reward for disrupting the vehicle 102 travel.

In various examples, the user interface 204 may include a display of a number of lives remaining 224. In various examples, the user may be awarded an initial number of lives remaining 224 and may earn lives in various ways, such as by advancing a level 214, satisfying an objective 218, or the like. In some examples, the user 202 may lose lives by performing an action that is unsafe, such as that which would result in a collision with the vehicle 102 and/or another object 104, such as object 104(4). In such examples, the user 202 may lose the life based on a determination that the user 202 (object 104 being controlled by user 202) was at fault in the collision.

Additionally or in the alternative, the vehicle 102 may be controlled based on user input. In such examples, the user interface 204 may be configured to receive input from the user 202 corresponding to vehicle 102 movements, such as utilizing the techniques described above. In various examples, the user interface 204 may include a control vehicle selection 226. In such examples, the user 202 may be able to select the vehicle 102 for control. In some examples, the user 202 may be disabled from control of the objects 104 when controlling the vehicle 102. In some examples, an option to control the vehicle, such as control vehicle selection 226, may be available based on a level associated with the user interface 204. As discussed above, the user input while controlling the vehicle 102 may be utilized by a training component, such as training component 130, in training an autonomous controller, such as autonomous controller 108, to perform actions similar to what a human would do. In such examples, the training component may be configured to improve autonomous vehicle control, such as by modifying one or more parameters of the autonomous controller 108.

Figure 3:
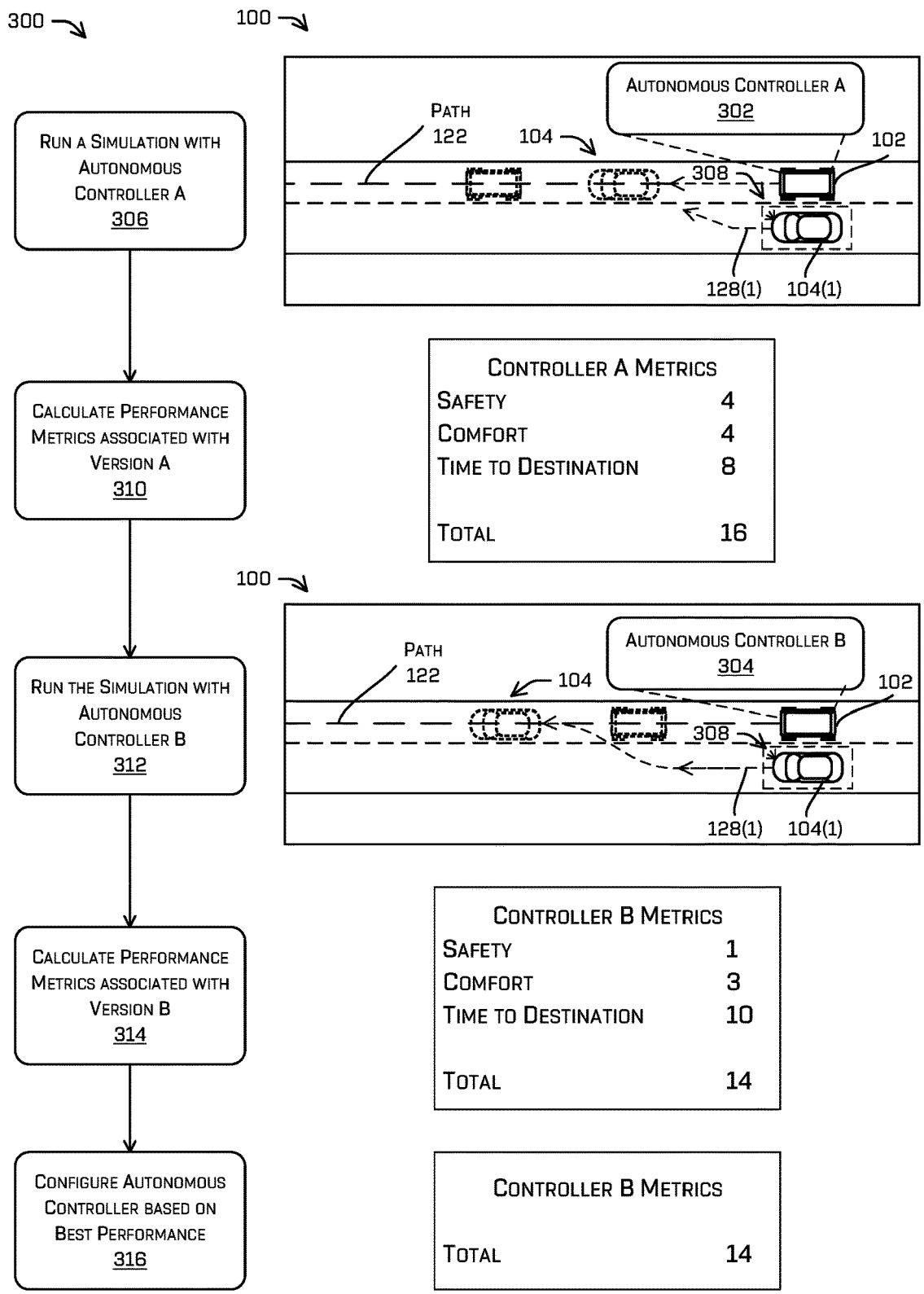
FIG. 3 illustrates a process for configuring a vehicle with an autonomous controller based on a performance thereof.

FIG. 3 illustrates a process 300 for evaluating performance of a first version of an autonomous controller 302 (e.g., autonomous controller A 302) and a second version of the autonomous controller 304 (e.g., autonomous controller B 304) executed in a simulation 100 and configuring an autonomous controller based on the highest performing version.

As discussed above, a computing system, such as simulation computing device 106, may execute different versions of an autonomous controller, such as autonomous controller 108 to identify an optimal version (e.g., best performing controller). In the illustrative example process, the computing system executes and compares performance associated with two versions, autonomous controller A 302, and autonomous controller B 304. However, this is merely for illustrative purposes and is not meant to be limiting. In other examples, additional versions of an autonomous controller may be executed in the simulation 100 and compared for incorporation in the autonomous controller.

In some examples, the computing system may generate the simulation 100 according to initialization parameters (e.g., initial parameters). The initial parameters may represent an initial state of the simulated environment. In various examples, the initialization parameters may include road conditions (e.g., smooth surface, potholes, gravel road, etc.), a map topography, weather conditions (e.g., rain, snow, sleet, fog, etc.), a starting point of the vehicle, a destination for the vehicle, a number of miles the vehicle travels to the destination, vehicle parameters, a number of objects 104 present in the environment (e.g., within a threshold distance of the vehicle, overall, etc.) and/or their respective states, object 104 density (e.g., number of pedestrians, cars, etc. per square mile, block, etc.), obstruction density (e.g., density of double parked vehicles, etc.), zoning (e.g., construction zone, school zone, etc.), particular sections of road (e.g., parsed from map data), or the like.

The simulation 100 may include one or more objects 104, such as object 104(1). In at least one example, the objects 104 may include computer-controlled objects 104. In such an example, the computing system may ensure a most accurate representation of differences in responses to object 104 actions between autonomous controller A 302 and autonomous controller B 304. In other examples, the objects 104 may include computer-controlled and/or user-controlled objects 104.

In various examples, the simulation may include one or more object parameters. The object parameters may include a level of aggressive behavior (e.g., docile, aggressive, etc.), speed control (e.g., ranges of speeds, consistent speeds, maximum speeds, etc.), acceleration rates (e.g., forward, lateral, etc.), yaw rates (e.g., associated with turning maneuvers, etc.), or the like of the objects 104 in the simulation. In various examples, the object parameters may be determined based on a classification associated therewith. For example, pedestrians may have associated therewith a first set of object parameters and cars may have associated therewith a second set of object parameters. In various examples, the initialization parameters and/or the object parameters may be determined based on a particular aspect of the autonomous controller being tested (e.g., vehicle parameter). For example, the autonomous controller A 302 may include a first software version for tracking pedestrians and the autonomous controller B 304 may include a second software version for tracking pedestrians. The computing system may generate the simulation with initialization parameters, objects, and/or object parameters designed to evaluate the ability of the respective autonomous controllers 302 and 304 to track pedestrians.

At operation 306, the computing system may run a simulation 100 with the autonomous controller A 302 controlling the vehicle 102. The autonomous controller A 302 may detect object 104(1), such as based on simulated sensor data associated therewith. The autonomous controller A 302 may determine that the object 104(1) is indicating an intent to change lanes to the right, based on indicator 308. The autonomous controller A 302 may predict one or more trajectories 126(1) associated with the object 104(1) movement. The autonomous controller A 302 may determine an action for the vehicle to take in response to the object 104(1), such as based on the trajectories 126(1). In some examples, the action may include a best action (e.g., lowest cost, optimal, etc.) of one or more actions identified by the autonomous controller A 302. As illustrated in FIG. 3, the action autonomous controller A 302 may determine includes accelerating in a lane along a path 122, such that the object 104(1) may change lanes and operate behind the vehicle 102.

At operation 310, the computing system may calculate performance metrics associated with the autonomous controller A 302. In various examples, the metrics calculated may be determined based on the particular aspect of the autonomous controllers A 302 and B 304 being tested (e.g., vehicle parameter). The metrics may represent the performance of the autonomous controller to identify the object 104(1) (e.g., detect, classify, determine relevance, track, determine trajectories 126(1), etc.). In some examples, the metrics may be determined based on a difference between data determined by the autonomous controller A 302 and a ground truth corresponding to the simulation (e.g., actual representation of the environment and/or objects represented therein), such as by utilizing techniques in the U.S. patent application Ser. No. 16/530,515 incorporated herein above. In some examples, the metrics may represent costs associated with the selected action based on one or more factors, such as a safety factor (e.g., at-fault collisions (e.g., vehicle fault), a comfort factor (e.g., lack of abrupt movements), a progress factor (e.g., average time to destination, delays caused by the action), an operational rules factor (e.g., following rules of the road, regulations, driving laws, etc.), or the like. In some examples, the metrics may be determined based on costs associated with one or more factors, such as described in U.S. patent application Ser. No. 16/539,928, incorporated by reference above. In the illustrated example, the metrics may include safety, comfort, and a time to destination (e.g., progress), though this is merely intended for illustrative purposes and is not intended to be limiting in any way. In various examples, and as described above with regard to FIG. 2, a selected action may incur penalties for undesirable actions and rewards for desirable actions. In such examples, the metrics may be based at least in part on the penalties and/or rewards.

In the illustrative example, the computing system may determine that accelerating to proceed in the lane ahead of the object 104(1) have associated therewith results in a safety cost of 4. The computing system may determine that a comfort of the object 104(1) may be low, such as due to a negative acceleration to slow down and merge in behind the vehicle and may assess an object comfort cost of 2. The computing system may determine that a comfort of the vehicle 102 may also be low, due to the positive acceleration to speed up ahead of the object 104(1), and may assess a vehicle comfort cost of 2, for a total comfort cost of 4. The computing system may determine that the action results in a progress cost, or time to destination cost of 8.

At operation 312, the computing system may run the simulation 100 with the autonomous controller B 304 controlling the vehicle 102. The autonomous controller B 304 may detect object 104(1), such as based on simulated sensor data associated therewith. The autonomous controller B 304 may determine that the object 104(1) is indicating an intent to change lanes to the right, based on the indicator 308. The autonomous controller B 304 may predict one or more trajectories 126(1) associated with the object 104(1) movement. The autonomous controller B 304 may determine an action for the vehicle 102 to take in response to the object 104(1), such as based on the trajectories 126(1). In some examples, the action may include a best action (e.g., lowest cost, optimal, etc.) of one or more actions identified by the autonomous controller B 304. As illustrated in FIG. 3, the action autonomous controller B 304 may determine to slowing down in the lane along the path 122, such that the object 104(1) may change lanes and operate in front of the vehicle 102.

At operation 314, the computing system may calculate performance metrics associated with the autonomous controller B 304. The metrics determined may include the same metrics determined with respect to autonomous controller A 302 in operation 310. In such examples, the computing system may compare the performance of the respective autonomous controllers with respect to the same metrics. In the illustrative example, the computing system may determine that slowing down to allow the object 104(1) to proceed may have associated therewith a safety cost of 1 (e.g., low likelihood of collision, very safe action, etc.). The computing system may determine that a comfort of the vehicle 102 may be low, such as due to a negative acceleration to slow down, and may assess a comfort cost of 3 (no object 104(1) comfort cost incurred). The computing system may determine that the progress cost associated with the action is higher due to the slow down, and may assess a time to destination cost of 10.

At operation 316, the computing system may configure an autonomous controller for incorporation into the vehicle 102 based on the best performing version of the autonomous controllers A or B. In various examples, the computing system may determine a best performing version based on a statistical analysis between the performance metrics associated with versions A and B of the autonomous controller. As such, the computing system may select the optimal version of the autonomous controller A 302 or B 304 for incorporation into the vehicle. In the illustrative example, the computing system may configure the autonomous controller with version B 304 of the autonomous controller based on a determination that the total cost associated with autonomous controller version B 304 was less than the total cost associated with autonomous controller version A 302.

Figure 4:
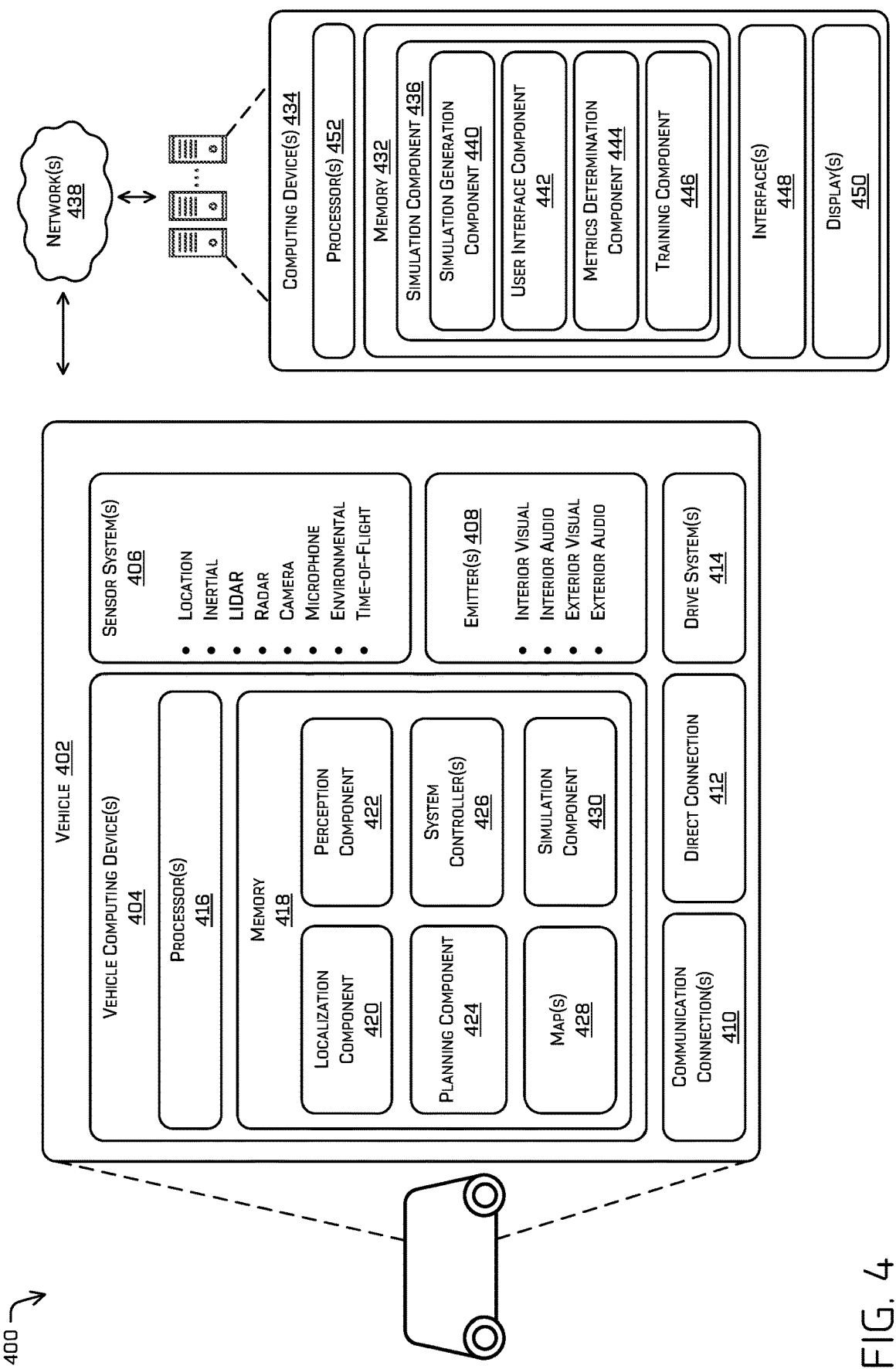
FIG. 4 is a block diagram of an example system for implementing the techniques described herein.

FIG. 4 is a block diagram of an example system 400 for implementing the techniques described herein. In at least one example, the system 400 may include a vehicle 402, such as the vehicle 102 in simulation 100.

The vehicle 402 may include one or more vehicle computing devices 404, one or more sensor systems 406, one or more emitters 408, one or more communication connections 410, at least one direct connection 412, and one or more drive systems 414.

The vehicle computing device(s) 404 may include one or more processors 416 and memory 418 communicatively coupled with the one or more processors 416. In the illustrated example, the vehicle 402 is an autonomous vehicle; however, the vehicle 402 could be any other type of vehicle, such as a semi-autonomous vehicle, or any other system having at least an image capture device (e.g., a camera enabled smartphone). In the illustrated example, the memory 418 of the vehicle computing device(s) 404 stores a localization component 420, a perception component 422, a planning component 424, one or more system controllers 426, one or more maps 428, and a simulation component 430. Though depicted in FIG. 4 as residing in the memory 418 for illustrative purposes, it is contemplated that the localization component 420, a perception component 422, a planning component 424, one or more system controllers 426, one or more maps 428, and the simulation component 430 may additionally, or alternatively, be accessible to the vehicle 402 (e.g., stored on, or otherwise accessible by, memory remote from the vehicle 402, such as, for example, on memory 432 of one or more computing devices 434). For example, the memory 432 may store a simulation component 436 accessible by the planning component 424 of the vehicle 402.

In at least one example, the localization component 420 may include functionality to receive data from the sensor system(s) 406 to determine a position and/or orientation of the vehicle 402 (e.g., one or more of an x-, y-, z-position, roll, pitch, or yaw). For example, the localization component 420 may include and/or request/receive a map of an environment, such as from map(s) 428, and may continuously determine a location and/or orientation of the autonomous vehicle within the map. In some instances, the localization component 420 may utilize SLAM (simultaneous localization and mapping), CLAMS (calibration, localization and mapping, simultaneously), relative SLAM, bundle adjustment, nonlinear least squares optimization, or the like to receive image data, lidar data, radar data, IMU data, GPS data, wheel encoder data, and the like to accurately determine a location of the autonomous vehicle. In some instances, the localization component 420 may provide data to various components of the vehicle 402 to determine an initial position of an autonomous vehicle for determining the relevance of an object to the vehicle 402, as discussed herein.

In some examples, the perception component 422 may include functionality to perform object detection, segmentation, and/or classification. In some examples, the perception component 422 may provide processed sensor data that indicates a presence of an object (e.g., entity) that is proximate to the vehicle 402 and/or a classification of the object as an object type (e.g., car, pedestrian, cyclist, animal, building, tree, road surface, curb, sidewalk, unknown, etc.). In some examples, the perception component 422 may provide processed sensor data that indicates a presence of a stationary entity that is proximate to the vehicle 402 and/or a classification of the stationary entity as a type (e.g., building, tree, road surface, curb, sidewalk, unknown, etc.). In additional or alternative examples, the perception component 422 may provide processed sensor data that indicates one or more characteristics associated with a detected object (e.g., a tracked object) and/or the environment in which the object is positioned. In some examples, characteristics associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Characteristics associated with the environment may include, but are not limited to, a presence of another object in the environment, a state of another object in the environment, a time of day, a day of a week, a season, a weather condition, an indication of darkness/light, etc.

In general, the planning component 424 may determine a path for the vehicle 402 to follow to traverse through an environment. For example, the planning component 424 may determine various routes and vehicle trajectories and various levels of detail. For example, the planning component 424 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 424 may generate an instruction for guiding the autonomous vehicle along at least a portion of the route from the first location to the second location. In at least one example, the planning component 424 may determine how to guide the autonomous vehicle from a first waypoint in the sequence of waypoints to a second waypoint in the sequence of waypoints. In some examples, the instruction may be a vehicle trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 402 to navigate.

In at least one example, the vehicle computing device(s) 404 may include one or more system controllers 426, which may be configured to control steering, propulsion, braking, safety, emitters, communication, and other systems of the vehicle 402. The system controller(s) 426 may communicate with and/or control corresponding systems of the drive system(s) 414 and/or other components of the vehicle 402.

The memory 418 may further include one or more maps 428 that may be used by the vehicle 402 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 402 may be controlled based at least in part on the map(s) 428. That is, the map(s) 428 may be used in connection with the localization component 420, the perception component 422, and/or the planning component 424 to determine a location of the vehicle 402, detect objects in an environment, generate routes, determine actions and/or trajectories to navigate within an environment.

In some examples, the one or more maps 428 may be stored on a remote computing device(s) (such as the computing device(s) 434) accessible via one or more networks 438. In some examples, multiple maps 428 may be stored based on, for example, a characteristic (e.g., type of entity, time of day, day of week, season of the year, etc.). Storing multiple maps 428 may have similar memory requirements, but increase the speed at which data in a map may be accessed.

As can be understood, the components discussed herein (e.g., the localization component 420, the perception component 422, the planning component 424, the one or more system controllers 426, the one or more maps 428 are described as divided for illustrative purposes. However, the operations performed by the various components may be combined or performed in any other component.

In some instances, aspects of some or all of the components discussed herein may include any models, techniques, and/or machine learning techniques. For example, in some instances, the components in the memory 418 (and the memory 432, discussed below) may be implemented as a neural network.

As described herein, an exemplary neural network is a biologically inspired technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In the illustrative example, the memory 418 may include a simulation component 430 and the computing device(s) 434 may include a simulation component 436. The simulation components 430 and 436 may be configured to generate simulations for evaluating a performance of an autonomous controller. For the purposes of this discussion, the autonomous controller may include a controller configured to perform the functions of one or more of the localization component 420, perception component 422, and planning component 422 of the vehicle computing device(s) 404. In other words, the autonomous controller may be configured to control the vehicle 402. Though simulation component 436 is illustrated as including additional components, such as simulation generation component 440 (such as simulation generation component 110), user interface component 442 (such as user interface 114), metrics determination component 444 (such as metrics determination component 134), and training component 446 (such as training component 130), simulation component 430 may also include one or more of the aforementioned components of simulation component 436.

The simulation components 430 and/or simulation component 436 may include a simulation generation component 440, such as simulation generation component 110. The simulation generation component 440 may be configured to generate one or more simulations based on one or more initialization parameters. The initial parameters may represent an initial state of the simulation(s). In various examples, the initial parameters may include road conditions (e.g., smooth surface, potholes, gravel road, etc.), a map topography, weather conditions (e.g., rain, snow, sleet, fog, etc.), a starting point of the vehicle, a destination for the vehicle, a number of miles the vehicle travels to the destination, vehicle parameters (e.g., versions of an AI code, hardware and/or software associated with the vehicle, etc.), a number of objects present in the environment (e.g., within a threshold distance of the vehicle, overall, etc.) and/or their respective states, object density (e.g., number of pedestrians, cars, etc. per square mile, block, etc.), obstruction density (e.g., density of double parked vehicles, etc.), zoning (e.g., construction zone, school zone, etc.), particular sections of road (e.g., parsed from map data), or the like. In various examples, the initialization parameters may be received via a user interface component 442, such as user interface 114. In some examples, the computing device(s) 434 may be configured to determine the initialization parameters, such as based on one or more parameters of the autonomous controller to be evaluated and/or trained (e.g., modified).

In various examples, the user interface component 442 may be configured to receive input corresponding to initialization parameters, vehicle parameters (e.g., parameters of the autonomous controller), object parameters, object movements, vehicle movements, or the like. In some examples, the computing device(s) 434 may include one or more computing devices configured to run simulations of vehicle 402 and/or object operation in simulated environments, such as utilizing the techniques described above.

In at least one example, a computing device of the one or more computing devices 434 may include a user computing device, such as user computing device 200. In such an example, the user interface may include a means by which a user may control movements of one or more objects and/or vehicles in a simulation, such as a simulation of the operation of vehicle 402. As discussed above with regard to FIGS. 1 and 2, the user input may be received via one or more input/output (I/O) devices, such as via one or more interfaces 448 of the computing device(s) 434. The interface(s) 448 may include I/O interfaces and/or network interfaces. The I/O interface(s) may include speakers, a microphone, a camera, and various user controls (e.g., buttons, a joystick, a keyboard, a keypad, etc.), a haptic output device, and so forth. The network interface(s) may include one or more interfaces and hardware components for enabling communication with various other devices over the network or directly. For example, network interface(s) may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

In some examples, a user may view the vehicle 402 and/or object movement in a simulated environment via one or more displays 450. Depending on the type of computing device, such as a user computing device, server computing device, or the like, the display 450 may employ any suitable display technology. For example, the display 450 may be a liquid crystal display, a plasma display, a light emitting diode display, an OLED (organic light-emitting diode) display, an electronic paper display, or any other suitable type of display able to present digital content thereon. In some examples, the display 450 may have a touch sensor associated with the display 450 to provide a touchscreen display configured to receive touch inputs for enabling interaction with a graphical user interface presented on the display 450. Accordingly, implementations herein are not limited to any particular display technology.

In various examples, the simulation components 430 and/or 436 may include a metrics determination component 444, such as metrics determination component 134. As discussed above, the metrics determination component may be configured to determine one or more metrics associated with the performance of the autonomous controller in a simulation. In some examples, the metrics may represent the performance of the autonomous controller to identify an object (e.g., detect, classify, determine relevance, track, determine trajectories, etc.). In some examples, the metrics may represent costs associated with an action performed by the vehicle 402 in the simulation. The costs may be based on one or more factors, such as a safety factor (e.g., at-fault collisions (e.g., vehicle fault), a comfort factor (e.g., lack of abrupt movements), a progress factor (e.g., average time to destination, delays caused by the action), an operational rules factor (e.g., following rules of the road, regulations, driving laws, etc.), or the like. In such examples, the metrics may be determined based on costs associated with each factor. In some examples, the action may incur penalties for undesirable actions and rewards for desirable actions. In various examples, the metric(s) may include the costs described above adjusted for the penalties and rewards.

In various examples, the simulation components 430 and/or 436 may include a training component 446 configured to train the autonomous controller to bias toward (e.g., select) high performing actions. High performing actions may include those with a cost below a threshold, a reward above a threshold reward, and/or a metric indicative of a good performance of the autonomous controller.

In various examples, the simulation components 430 and/or 436 may utilize actual sensor data captured by the sensor system(s) 406 of one or more vehicles 402 and/or simulated sensor data (e.g., data generated as a replicate of actual sensor data). In at least one example, the sensor system(s) 406 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 may include multiple instances of each of these or other types of sensors. For instance, the lidar sensors may include individual lidar sensors located at the corners, front, back, sides, and/or top of the vehicle 402. As another example, the camera sensors may include multiple cameras disposed at various locations about the exterior and/or interior of the vehicle 402. The sensor system(s) 406 may provide input to the vehicle computing device(s) 404. Additionally or in the alternative, the sensor system(s) 406 may send sensor data, via the one or more networks 438, to the one or more computing device(s) 434 at a particular frequency, after a lapse of a predetermined period of time, in near real-time, etc.

The vehicle 402 may also include one or more emitters 408 for emitting light and/or sound. The emitters 408 may include interior audio and visual emitters to communicate with passengers of the vehicle 402. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 408 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 402 may also include one or more communication connections 410 that enable communication between the vehicle 402 and one or more other local or remote computing device(s). For instance, the communication connection(s) 410 may facilitate communication with other local computing device(s) on the vehicle 402 and/or the drive system(s) 414. Also, the communication connection(s) 410 may allow the vehicle to communicate with other nearby computing device(s) (e.g., computing device(s) 434, other nearby vehicles, etc.).

The communications connection(s) 410 may include physical and/or logical interfaces for connecting the vehicle computing device(s) 404 to another computing device or a network, such as network(s) 438. For example, the communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s) 434.

In at least one example, the vehicle 402 may include one or more drive systems 414. In some examples, the vehicle 402 may have a single drive system 414. In at least one example, if the vehicle 402 has multiple drive systems 414, individual drive systems 414 may be positioned on opposite ends of the vehicle 402 (e.g., the front and the rear, etc.). In at least one example, the drive system(s) 414 may include one or more sensor systems to detect conditions of the drive system(s) 414 and/or the surroundings of the vehicle 402. By way of example and not limitation, the sensor system(s) may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 414. In some cases, the sensor system(s) on the drive system(s) 414 may overlap or supplement corresponding systems of the vehicle 402 (e.g., sensor system(s) 406).

The drive system(s) 414 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 may include a drive module controller which may receive and preprocess data from the sensor system(s) and to control operation of the various vehicle systems. In some examples, the drive module controller may include one or more processors and memory communicatively coupled with the one or more processors. The memory may store one or more systems to perform various functionalities of the drive system(s) 414. Furthermore, the drive system(s) 414 may also include one or more communication connection(s) that enable communication by the respective drive module with one or more other local or remote computing device(s).

In at least one example, the direct connection 412 may provide a physical interface to couple the one or more drive system(s) 414 with the body of the vehicle 402. For example, the direct connection 412 may allow the transfer of energy, fluids, air, data, etc. between the drive system(s) 414 and the vehicle. In some instances, the direct connection 412 may further releasably secure the drive system(s) 414 to the body of the vehicle 402.

In at least one example, the localization component 420, the perception component 422, the planning component 424, the one or more system controllers 426, the one or more maps 428, and the simulation component 430, may process data (e.g., sensor data, simulation data), as described above, and may send their respective outputs, over the one or more network(s) 438, to the computing device(s) 434. In at least one example, the localization component 420, the perception component 422, the planning component 424, the one or more system controllers 426, the one or more maps 428, and the simulation component 430, may send their respective outputs to the computing device(s) 434 at a particular frequency, after a lapse of a predetermined period of time, in near real-time, etc.

In some examples, the vehicle 402 may send sensor data to the computing device(s) 434 via the network(s) 438. In some examples, the vehicle 402 may receive sensor data from the computing device(s) 434 and/or one or more remote sensor systems via the network(s) 438. The sensor data may include raw sensor data and/or processed sensor data and/or representations of sensor data. In some examples, the sensor data (raw or processed) may be sent and/or received as one or more log files.

The computing device(s) 434 may include one or more processors 452 and a memory 432 storing the simulation component 436. The processor(s) 416 of the vehicle 402 and the processor(s) 452 of the computing device(s) 434 may be any suitable processor capable of executing instructions to process data and perform operations as described herein. By way of example and not limitation, the processor(s) 416 and 452 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 418 and 432 are examples of non-transitory computer-readable media. The memory 418 and 432 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 418 and 432 may include at least a working memory and a storage memory. For example, the working memory may be a high-speed memory of limited capacity (e.g., cache memory) that is used for storing data to be operated on by the processor(s) 416 and 452. In some instances, the memory 418 and 432 may include a storage memory that may be a lower-speed memory of relatively large capacity that is used for long-term storage of data. In some cases, the processor(s) 416 and 452 cannot operate directly on data that is stored in the storage memory, and data may need to be loaded into a working memory for performing operations based on the data, as discussed herein.

It should be noted that while FIG. 4 is illustrated as a distributed system, in alternative examples, components of the vehicle 402 may be associated with the computing device(s) 434 and/or components of the computing device(s) 434 may be associated with the vehicle 402. That is, the vehicle 402 may perform one or more of the functions associated with the computing device(s) 434, and vice versa.

Figure 5:
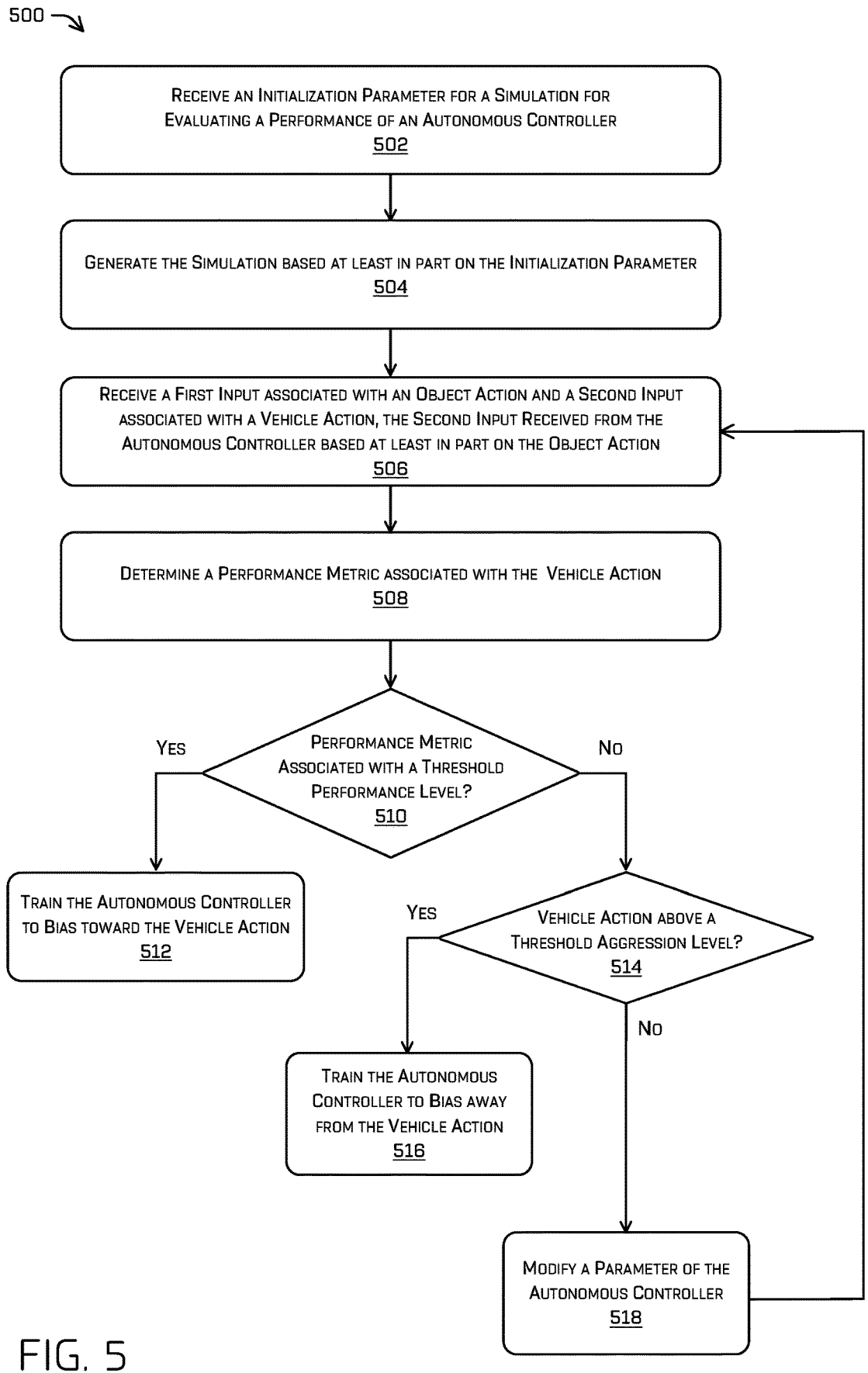
FIG. 5 depicts an example process for training an autonomous controller based on a performance of an autonomous controller controlling a vehicle in a simulation.
Figure 6:
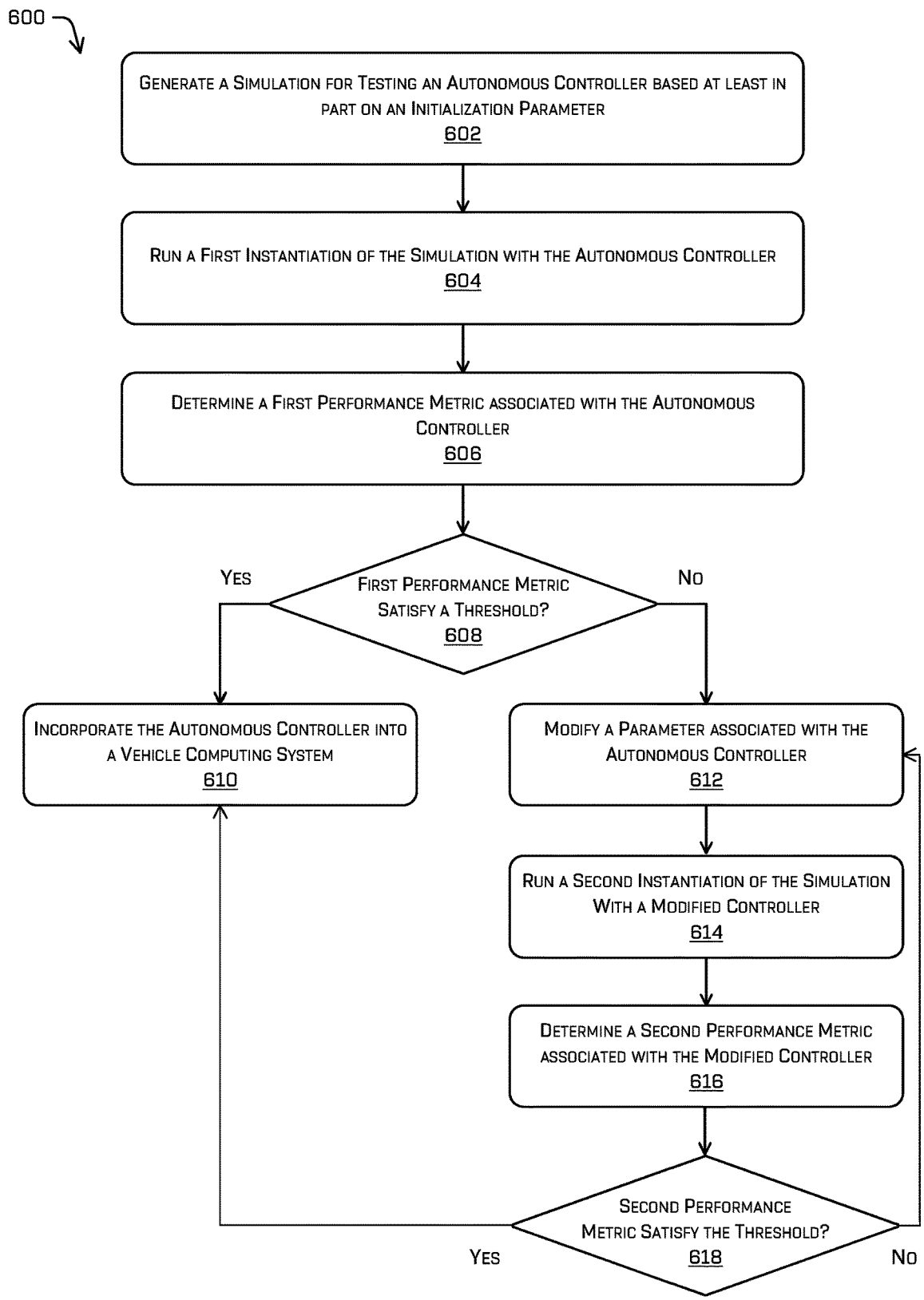
FIG. 6 depicts an example process for training an autonomous controller to a threshold performance.
Figure 7:
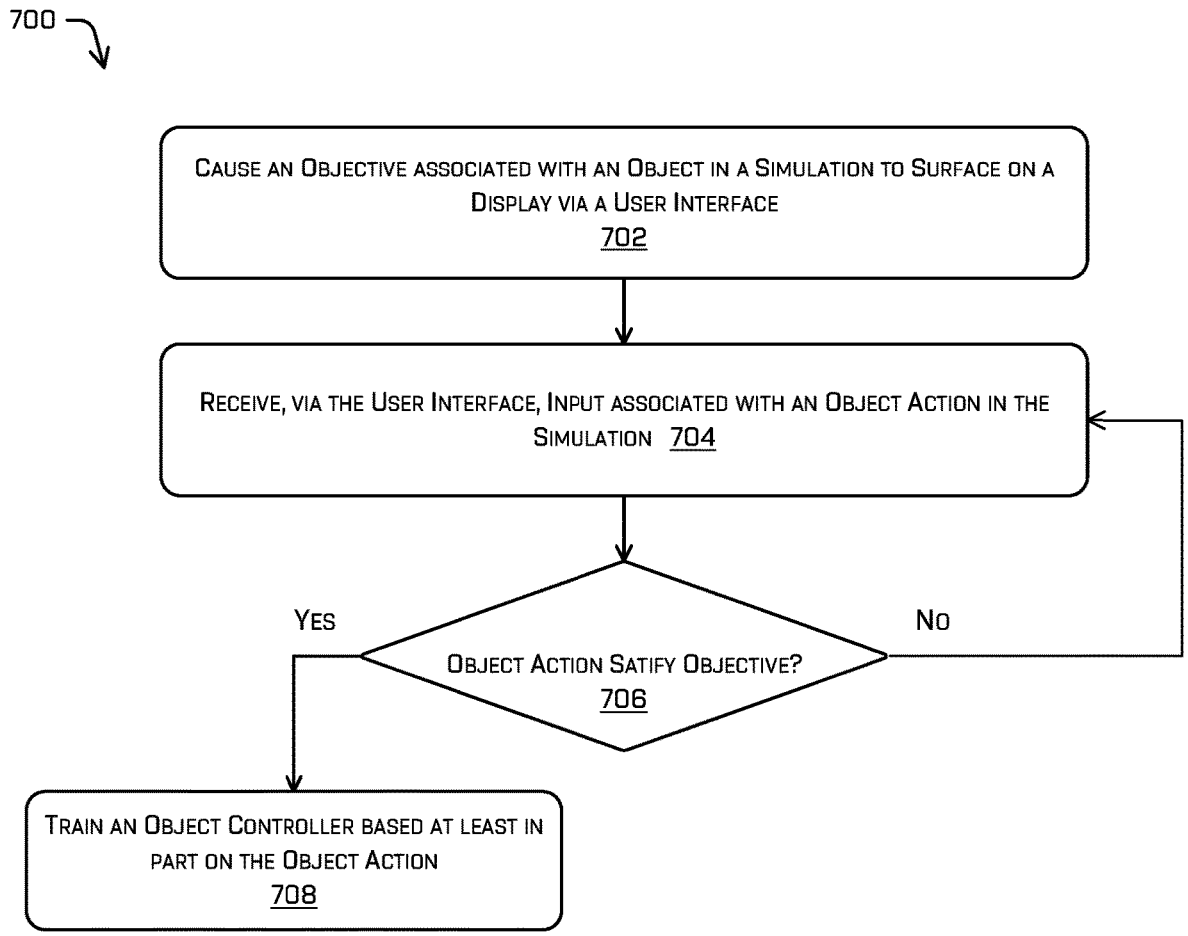
FIG. 7 depicts an example process for training an object controller based at least in part on input associated with object actions provided via a user interface.

FIGS. 5-7 illustrate example processes in accordance with embodiments of the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

FIG. 5 depicts an example process 500. Some or all of the process 500 may be performed by one or more components in FIG. 4, as described herein. For example, some or all of the process 500 may be performed by the vehicle computing device(s) 404 and/or computing device(s) 434.

At operation 502, the process may include receiving an initialization parameter for a simulation for evaluating a performance of an autonomous controller. The initialization parameters may represent an initial state of the simulation. In various examples, the initialization parameters may include road conditions (e.g., smooth surface, potholes, gravel road, etc.), map data of a location in an environment, weather conditions (e.g., rain, snow, sleet, fog, etc.), a starting point of the vehicle, a destination for the vehicle, a number of miles the vehicle travels to the destination, vehicle parameters (e.g., versions of an AI code, hardware and/or software associated with the vehicle, etc.), a number of objects present in the environment (e.g., within a threshold distance of the vehicle, overall, etc.) and their respective states, object density (e.g., number of pedestrians, cars, etc. per square mile, block, etc.), obstruction density (e.g., density of double parked vehicles, etc.), zoning (e.g., construction zone, school zone, etc.), particular sections of road (e.g., parsed from map data), or the like.

In various examples, the initialization parameters can be received from a user, such as via a user interface. In such examples, the user may configure the simulation to evaluate a particular parameter and/or function of the autonomous controller, such as based on a software update. In some examples, the initialization parameters may be determined by a computing device, such as simulation computing device 106, based on one or more parameters and/or functions to be evaluated, a training routine (e.g., scheduled evaluation of parameters (e.g., aspects) of the autonomous controller, updates applied to the controller, changes made to one or more parameters of the controller, or the like, including at random.

In various examples, a computing device, such as simulation computing device 106 may receive one or more object parameters. The object parameters may include one or more limitations to object movements in the simulation, such as a maximum velocity, acceleration (e.g., lateral and/or longitudinal), a maximum number of lane changes at once, maximum yaw rate, or the like. In various examples, the object parameters may be based on a level of difficulty associated with the simulation. In such examples, the level of difficulty may represent a difficulty for the autonomous controller to safely navigate different scenarios therein while progressing toward an objective.

At operation 504, the process may include generating the simulation based at least in part on the initialization parameter. The simulation may include the vehicle and one or more objects. In various examples, the simulation may include an initial position of the vehicle and/or the one or more objects. In some examples, the simulation may include a vehicle destination. In some examples, the simulation may include one or more objective associated with the object(s) (e.g., arrive at destination, arrive at destination before vehicle, disrupt vehicle travel, no at-fault collisions, etc.). In various examples, the computing device may generate the simulation based on the object parameters.

At operation 506, the process may include receiving a first input associated with an object action and a second input associated with a vehicle action, the second input received from the autonomous controller based at least in part on the object action. In some examples, the first input may be received from the computing device. In such examples, the object may include a computer-controlled object. In some examples, the first input may be received from a user, such as via an instance of a user interface. In such examples, the object may include a user-controlled object. In some examples, the first input may be based on the one or more objectives associated with the object(s).

In various examples, the second input may be responsive to the object action. In such examples, the autonomous controller may be evaluated based on a reaction of the autonomous controller to the object action.

At operation 508, the process may include determining a performance metric associated with the vehicle action. The performance metric may include a safety cost, a comfort cost, a progress cost, and/or an operational rules cost, such as those described above. In some examples, the performance metric may represent an ability for the autonomous controller to detect, track, classify, and/or determine relevance of the object. In some examples, the performance metric may represent an ability of the autonomous controller to successfully navigate the vehicle through the simulation based in part on the object action.

At operation 510, the process may include determining whether the performance metric is associated with a threshold performance level. In some examples, the threshold performance level may include a minimum level of performance required by the autonomous controller. In some examples, the threshold performance level may be associated with a total cost corresponding to an action.

In various examples, the threshold performance level may include a minimum performance value above a previous version of the autonomous controller. In some examples, the threshold performance level may include an average performance metric. In examples in which the threshold performance level is based on performance metrics associated with previous performance, the computing system may be configured to incrementally improve performance of the autonomous controller.

Based on a determination that the performance metric is associated with the threshold level ("Yes" at operation 510), the process, at operation 512, the process may include training (e.g., modifying) the autonomous controller to bias toward the vehicle action. In various examples, training the autonomous controller may include modifying one or more parameters associated therewith. In some examples, the training may be performed based on a cost associated with a vehicle action. In such examples, the computing system may train autonomous controller to bias toward low cost vehicle actions. In various examples, one or more other vehicles may be controlled based on user input, such as via a user interface. In such examples, the training of the autonomous controller may be performed utilizing user input. In some examples, the training may be performed utilizing machine learning techniques. In such examples, the data associated with the scenario (e.g., object position, object movement, vehicle position, vehicle action, etc.) may be utilized as training data to bias the autonomous controller to perform the action in a similar scenario. In at least some examples, such machine learning techniques may comprise reinforcement learning.

Based on a determination that the cost is not associated with the threshold performance level ("No" at operation 510), the process, at operation 514, determining whether the vehicle action is associated with an aggression level above a threshold level. The aggression level may be associated with a longitudinal acceleration, lateral acceleration, yaw rate, number of lane changes, or the like. In some examples, the threshold aggression level may represent a maximum allowable level of aggressive behavior of the vehicle (e.g., maximum lateral acceleration, maximum longitudinal acceleration, maximum yaw rate, maximum number of lane changes, etc.).

Based on a determination that the vehicle action is associated with an aggression level above the threshold level ("Yes" at operation 514), the process may include, at operation 516, training the autonomous controller to bias away from the vehicle action. In some examples, the training may be performed utilizing machine learning techniques. In such examples, the data associated with the scenario (e.g., object position, object movement, vehicle position, vehicle action, etc.) may be utilized as training data to bias the autonomous controller away from performing the vehicle action in another (similar) scenario.

Based on a determination that the vehicle action is not associated with an aggression level above the threshold level ("No" at operation 514), the process, at operation 518, may include modifying a parameter of the autonomous controller. The parameter may include a hardware and/or software component associated with the autonomous controller. In some examples, the parameter may be associated with the performance metric determined at operation 508. In various examples, responsive to modifying the parameter (and generating a modified controller), the process may include receiving inputs comprising object actions (e.g., user inputs and/or computer-controlled object inputs) in the simulation and inputs, from the modified controller, comprising simulated vehicle actions.

FIG. 6 depicts an example process 600 for depicts an example process for controlling a vehicle according to an action based at least in part on a safety cost associated with the action. Some or all of the process 600 may be performed by one or more components in FIG. 4, as described herein. For example, some or all of the process 600 may be performed by the computing device(s) 434.

At operation 602, the process may include generating a simulation for testing an autonomous controller based at least in part on an initialization parameter. The simulation may include a vehicle and one or more objects. In various examples, the simulation may include an initial position of the vehicle and/or the one or more objects. In some examples, the simulation may include a vehicle destination. In some examples, the simulation may include one or more objectives associated with the object(s) (e.g., arrive at destination, arrive at destination before vehicle, disrupt vehicle travel, no at-fault collisions, etc.). In various examples, the computing device may generate the simulation based on the object parameters.

The initialization parameter may represent an initial state of the simulation, such as those described above. In various examples, the initialization parameter may be received from a user, such as via a user interface. In such examples, the user may configure the simulation to evaluate a particular parameter and/or function of the autonomous controller, such as based on a software update. In some examples, the initialization parameters may be determined by a computing device, such as simulation computing device 106, based on one or more parameters and/or functions to be evaluated, a training routine (e.g., scheduled evaluation of parameters (e.g., aspects) of the autonomous controller, updates applied to the controller, changes made to one or more parameters of the controller, or the like.

In various examples, the computing device may receive one or more object parameters. The object parameters may include one or more limitations to object movements in the simulation, such as a maximum velocity, acceleration (e.g., lateral and/or longitudinal), a maximum number of lane changes at once, maximum yaw rate, or the like. In various examples, the object parameters may be based on a level of difficulty associated with the simulation. In such examples, the level of difficulty may represent a difficulty for the autonomous controller to safely navigate different scenarios therein while progressing toward an objective.

At operation 604, the process may include running a first instantiation of the simulation with the autonomous controller. Running the first instantiation of the simulation may include receiving input regarding object actions and moving the object forward in the simulation based on the object actions and receiving input from the autonomous controller regarding vehicle actions. In some examples, the input received from the autonomous controller may be based at least in part on the object actions (e.g., reactionary inputs). The inputs associated with the object actions may be received from an object controller of the computing device and/or from a user computing device, such as via a user interface.

At operation 606, the process may include determining a first performance metric associated with the autonomous controller. The performance metric may include a safety cost, comfort cost, progress cost, and/or operational rules cost, such as those described above. In some examples, the performance metric may represent an ability of the autonomous controller to detect, track, classify, and/or determine relevance of the object(s). In some examples, the performance metric may represent an ability of the autonomous controller to successfully navigate the vehicle through the simulation based in part on object actions.

At operation 608, the process may include determining whether the first performance metric satisfies a threshold. The threshold may include a threshold performance level and/or minimum performance of the autonomous controller, such as with respect to a particular parameter tested. In some examples, the threshold may include a threshold cost (e.g., maximum cost), threshold number of penalties (e.g., maximum number of penalties assessed), threshold number of rewards (e.g., minimum number of rewards).

Based on a determination that the first performance metric satisfies the threshold ("Yes" at operation 608), the process, at operation 610, may include incorporating the autonomous controller into a vehicle computing system, such as vehicle computing device(s) 404.

Based on a determination that the first performance metric did not satisfy the threshold ("No" at operation 608), the process, at operation 612, may include modifying a parameter associated with the autonomous controller. The parameter may include a hardware and/or software component associated with the autonomous controller. In various examples, the parameter may include a particular parameter tested in the simulation, such as based on an update to the particular parameter. In some examples, the parameter may be associated with the first performance metric, such that a determination that the first performance metric does not satisfy the threshold is a reflection on the performance of the parameter of the autonomous controller.

At operation 614, the process may include running a second instantiation of the simulation with a modified controller. The modified controller may include the autonomous controller with the modified parameter. In some examples, the second instantiation may be substantially similar to the first instantiation. In such examples, the performance of the modified controller may be tested in substantially the same conditions as the autonomous controller. In at least one example, the second instantiation may include the initialization parameter.

At operation 616, the process may include determining a second performance metric associated with the modified controller. As discussed above, the performance metric may include a safety cost, comfort cost, progress cost, and/or operational rules cost. In some examples, the performance metric may represent an ability of the modified controller to detect, track, classify, and/or determine relevance of the object(s). In some examples, the performance metric may represent an ability of the modified controller to successfully navigate the vehicle through the simulation based in part on object actions.

At operation 618, the process may include determining whether the second performance metric satisfies the threshold. The threshold may include a threshold performance level and/or minimum performance of the modified controller, such as with respect to a particular parameter tested. In some examples, the threshold may include a threshold cost (e.g., maximum cost), threshold number of penalties (e.g., maximum number of penalties assessed), threshold number of rewards (e.g., minimum number of rewards).

Based on a determination that the second performance metric satisfies the threshold ("Yes" at operation 618), the process may include incorporating the modified controller into the vehicle computing system, as described above with regard to operation 610.

Based on a determination that the second performance metric does not satisfy the threshold ("No" at operation 618), the process may include modifying the parameter associated with the modified controller, as described above with regard to operation 612. In some examples, the computing system may iteratively test modified controllers until identifying a modified controller that satisfies the threshold. In such examples, the computing system may incorporate the modified controller that satisfies the threshold into the vehicle computing system.

FIG. 7 depicts an example process 700 for controlling a vehicle based at least in part on a probability that an object is present in an occlusion zone. Some or all of the process 700 may be performed by one or more components in FIG. 4, as described herein. For example, some or all of the process 700 may be performed by the vehicle computing device(s) 404 and/or the computing device(s) 434.

At operation 702, the process may include causing an objective associated with an object in a simulation to surface on a display via a user interface. The display may include a display of a user computing device via which the user may control one or more objects in a simulation. The objective(s) may include an object destination, a time to arrive at destination, a disruption to vehicle travel, or the like.

At operation 704, the process may include receiving, via the user interface, input associated with an object action in the simulation. In various examples, the input may include user input received via a user interface. In such examples, the object may include a user-controlled object. In some examples, one or more objects in the simulation may be computer-controlled objects. In such examples, a simulation computing device may determine and input controls corresponding to the respective object actions.

At operation 706, the process may include determining whether the object action satisfies the objective. In some examples, a determination that the object satisfies the objective may include a threshold amount of the objective satisfied (e.g., arrive at destination 2 seconds before the vehicle, delay vehicle by more than 1 second, etc.). For example, the objective may include a disruption to vehicle travel in the simulation. The threshold for disrupting the vehicle travel may include a delay of more than one second. Thus, the computing device may determine that the objective is satisfied based on a determination that a vehicle delay is greater than 1 second.

Based on a determination that the object action does not satisfy the objective ("No" at operation 706), the process may include receiving additional input associated with another object action, such as described with regard to operation 704. The additional input may correspond to the object or another user-controlled object in the simulation. In some examples, the additional input associated with the other user-controlled object may be received by a same instance of the user interface as the input associated with the object action or a different instance of the user interface. In examples in which the additional input s received via a different instance of the user interface, the simulation may include a multi-user (e.g., multi-player) simulation.

Based on a determination that the object action satisfies the objective ("Yes" at operation 706), the process may include, at operation 708, training an object controller based at least in part on the object action. Training the object controller may include modifying one or more parameters associated with the object controller, such as a modification to a hardware component and/or software associated with the vehicle to increase performance of the vehicle. The object controller may include one or more computer programs associated with a computing device, such as simulation computing system(s) 106, computing device(s) 434, and/or other computing devices described herein. The object controller may be configured to control computer-controlled objects, such as computer-controlled objects 104(1), 104(3), and 104(5) of FIG. 1, in simulations.

In various examples, the object controller may be trained utilizing machine learning techniques. In such examples, data associated with the object action may be used as training data to bias the object controller toward the object action. Though this is merely an example, and any other method of training and/or biasing action of the object controller is contemplated herein.

Example Clauses

A: A system comprising: one or more processors; and memory storing processor-executable instructions that, when executed by the one or more processors, configure the one or more processors to: receive an initialization parameter associated with a simulation for evaluating a performance of an autonomous controller; generate the simulation based at least in part on the initialization parameter; receive a first input associated with an object action of an object in the simulation, wherein the first input comprises at least one of: a user input received from a user computing device via a user interface; or a computer-generated input generated by a computing system; receive, from the autonomous controller and based at least in part on the object action, a simulated vehicle action for the autonomous vehicle to perform in the simulation; determine a performance metric associated with the autonomous controller based at least in part on the simulated vehicle action; and modify one or more parameters of the autonomous controller based at least in part on the performance metric.

B: A system as paragraph A describes, wherein the autonomous controller comprises a machine learned model trained utilizing reinforcement learning.

C: A system as either paragraph A or paragraph B describe, wherein the object is an adversarial object of an adversarial network and wherein the instructions further configure the one or more processors to: determine an objective of the adversarial object; determine that the object action satisfies the objective; determine a reward based at least in part on determining that the object action satisfies the objective; and train the adversarial network based at least in part on the reward.

D: system as any one of paragraphs A-C describe, wherein the first input is the user input and wherein the instructions further configure the one or more processors to: receive an object parameter associated with the object, wherein the object parameter comprises at least one of a maximum velocity or a maximum acceleration of the object; determine that the user input exceeds the at least one of the maximum velocity or the maximum acceleration of the object; and map the user input to the at least one of the maximum velocity or the maximum acceleration of the object.

E: A The system as any one of paragraphs A-D describe, wherein the performance metric is based at least in part on at least one of: a safety cost associated with the simulated vehicle action, wherein the safety cost is based at least in part on a minimum distance between the autonomous vehicle and the object in the simulation or a difference in velocity between a vehicle trajectory and an object trajectory; a comfort cost associated with the simulated vehicle action, wherein the comfort cost is based at least in part on at least one of: the minimum distance between the autonomous vehicle and the object; a lateral acceleration associated with the simulated vehicle action; or a longitudinal acceleration associated with the simulated vehicle action; a progress cost associated with the simulated vehicle action, wherein the progress cost is based at least in part on a delay in reaching a destination associated with the simulated vehicle action; or an operational rules cost, wherein the operational rules cost is based at least in part on a law or a regulation associated with vehicular operation.

F: A method comprising: generating a simulation based at least in part on an initialization parameter; receiving a first input associated with an object action of an object, wherein the first input comprises at least one of a user input received from a user computing device or a computer-generated input received from a computing system; receiving, from a controller configured for controlling a vehicle, a simulated vehicle action, wherein the simulated vehicle action is based at least in part on the object action; determining a performance metric associated with the controller based at least in part on the simulated vehicle action; and modifying a parameter associated with the controller based at least in part on the performance metric.

G: A method as paragraph F describes, wherein the initialization parameter comprises at least one of: a road condition associated with the simulation; a weather condition associated with the simulation; an initial position associated with the vehicle; an initial position associated with the object; a number of objects present in the simulation; an object density associated with the simulation; or a level of complexity associated with the simulation.

H: A method as either paragraph F or paragraph G describe, wherein the object is an adversarial object of an adversarial network, the method further comprising: determining an objective of the adversarial object; determining that the object action satisfies the objective; determining a reward based at least in part on determining that the object action satisfies the objective; and training the adversarial network based at least in part on the reward.

I: A method as any one of paragraphs F-H describe, wherein the performance metric is based at least in part on at least one of: a safety cost associated with the simulated vehicle action based at least in part on a minimum distance between the vehicle and the object in the simulation; a comfort cost associated with the simulated vehicle action based at least in part on at least one of an acceleration associated with the simulated vehicle action or the minimum distance between the vehicle and the object; a progress cost associated with the simulated vehicle action based at least in part on a calculated delay in the vehicle reaching a destination; or an operational rules cost associated with the simulated vehicle action based at least in part on one or more rules associated with vehicular travel in an environment.

J: A method as any one of paragraphs F-I describe, wherein the first input is the user input, the method further comprising: receiving an object parameter associated with the object, wherein the object parameter comprises at least one of a maximum velocity or a maximum acceleration of the object; determining that the first input exceeds the at least one of the maximum velocity or the maximum acceleration of the object; and mapping the object action to the at least one of the maximum velocity or the maximum acceleration of the object.

K: A method as any one of paragraphs F-J describe, wherein the controller is trained utilizing machine learning techniques comprising reinforcement learning.

L: A method as any one of paragraphs F-K describe, wherein a modification to the parameter of the controller generates a modified controller, the method further comprising: receiving a second input associated with a second object action of the object; receiving, from the modified controller, a second simulated vehicle action, wherein the second simulated vehicle action is based at least in part on the second object action; and determining a second performance metric associated with the second simulated vehicle action.

M: A method as paragraph L describes, further comprising: determining that the second performance metric exceeds a second performance threshold associated with the function; and validating the modified controller.

N: A method as any one of paragraphs F-M describe, further comprising: determining an object goal associated with an operation of the object in the simulation; determining that the object action satisfies the object goal; and training a computing system configured to control one or more objects to bias toward the object action based at least in part on the object action satisfying the object goal.

O: A system or device comprising: a processor; and a non-transitory computer-readable medium storing instructions that, when executed, cause a processor to perform a computer-implemented method as any one of paragraphs F-N describe.

P: A system or device comprising: a means for processing; and a means for storing coupled to the means for processing, the means for storing including instructions to configure one or more devices to perform a computer-implemented method as any one of paragraphs F-N describe.

Q: A non-transitory computer-readable medium storing instructions that, when executed, cause one or more processors to perform operations comprising: generating a simulation based at least in part on an initialization parameter; receiving a first input associated with an object action, wherein the first input comprises at least one of a computer-generated input received from a computing system or a user-generated input received via a user interface; receiving, from a controller configured for controlling a vehicle, a simulated vehicle action, wherein the simulated vehicle action is based at least in part on the object action; determining a performance metric associated with the controller based at least in part on the simulated vehicle action; and modifying a parameter associated with the controller based at least in part on the performance metric.

R: A non-transitory computer-readable medium as paragraph Q describes, wherein the vehicle is a first vehicle, the operations further comprising; receiving, via an instance of the user interface configured for controlling a second vehicle, a third input associated with a second simulated vehicle action of the second vehicle; determining a second performance metric associated with the second simulated vehicle action; and training the controller based at least in part on the second performance metric.

S: A non-transitory computer-readable medium as either paragraph Q or paragraph R describes, wherein the controller is trained utilizing machine learning techniques comprising reinforcement learning.

T: A non-transitory computer-readable medium as any one of paragraphs Q-S describe, the operations further comprising: determining a second performance metric associated with a modified controller; determining that the second performance metric exceeds a second performance threshold associated with the function; and validating the modified controller.

U: A non-transitory computer-readable medium as any one of paragraphs Q-T describe, wherein the performance metric is based at least in part on at least one of: a safety cost associated with the simulated vehicle action, wherein the safety cost is based at least in part on a minimum distance between the vehicle and the object in the simulation or a difference in velocity between a vehicle trajectory and an object trajectory; a comfort cost associated with the simulated vehicle action, wherein the comfort cost is based at least in part on at least one of: the minimum distance between the vehicle and the object; a lateral acceleration associated with the simulated vehicle action; or a longitudinal acceleration associated with the simulated vehicle action; a progress cost associated with the simulated vehicle action, wherein the progress cost is based at least in part on a delay in reaching a destination associated with the simulated vehicle action; or an operational rules cost, wherein the operational rules cost is based at least in part on a law or a regulation associated with vehicular operation.

V: A non-transitory computer-readable medium as any one of paragraphs Q-U describe, wherein the object is an adversarial object associated with an adversarial network and wherein the operations further comprise: determining an objective associated with the object action; determining a reward based at least in part on the objective; and training the adversarial network based at least in part on the reward.

W: A vehicle comprising: a processor; and a non-transitory computer-readable medium as any one of paragraphs Q-V describe coupled to the processor.

X: A system comprising: a processor; and a non-transitory computer-readable medium as any one of paragraphs Q-V describe coupled to the processor.

While the example clauses described above are described with respect to one particular implementation, it should be understood that, in the context of this document, the content of the example clauses may also be implemented via a method, device, system, a computer-readable medium, and/or another implementation. Additionally, any of examples A-## may be implemented alone or in combination with any other one or more of the examples A-##.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   memory storing processor-executable instructions that, when executed by the one or more processors, configure the one or more processors to:
      receive an initialization parameter associated with a simulation for evaluating a performance of an autonomous controller;
      generate the simulation based at least in part on the initialization parameter;
      receive a first input associated with an object action of an object in the simulation, wherein the first input comprises:
         a user input received from a user computing device via a user interface;
      receive, from the autonomous controller and based at least in part on the object action, a simulated vehicle action for an autonomous vehicle to perform in the simulation;
      determine a performance metric associated with the autonomous controller based at least in part on the simulated vehicle action; and
      modify one or more parameters of the autonomous controller based at least in part on the performance metric.

2. The system as claim 1 recites, wherein the autonomous controller comprises a machine learned model trained utilizing reinforcement learning.

3. The system as claim 1 recites, wherein the instructions further configure the one or more processors to:
   receive an object parameter associated with the object, wherein the object parameter comprises at least one of a maximum velocity or a maximum acceleration of the object;
   determine that the user input exceeds the at least one of the maximum velocity or the maximum acceleration of the object; and
   map the user input to the at least one of the maximum velocity or the maximum acceleration of the object.

4. The system as claim 1 recites, wherein the object is an adversarial object of an adversarial network and wherein the instructions further configure the one or more processors to:
   determine an objective of the adversarial object;
   determine that the object action satisfies the objective;
   determine a reward based at least in part on determining that the object action satisfies the objective; and
   train the adversarial network based at least in part on the reward.

5. The system as claim 1 recites, wherein the performance metric is based at least in part on at least one of:
   a safety cost associated with the simulated vehicle action, wherein the safety cost is based at least in part on a minimum distance between the autonomous vehicle and the object in the simulation or a difference in velocity between a vehicle trajectory and an object trajectory;
   a comfort cost associated with the simulated vehicle action, wherein the comfort cost is based at least in part on at least one of:
      the minimum distance between the autonomous vehicle and the object;
      a lateral acceleration associated with the simulated vehicle action; or
      a longitudinal acceleration associated with the simulated vehicle action;
   a progress cost associated with the simulated vehicle action, wherein the progress cost is based at least in part on a delay in reaching a destination associated with the simulated vehicle action; or
   an operational rules cost, wherein the operational rules cost is based at least in part on a law or a regulation associated with vehicular operation.

6. A method comprising:
   generating a simulation based at least in part on an initialization parameter;
   receiving a first input associated with an object action of an object, wherein the first input comprises a user input received from a user computing device;
   receiving, from a controller configured for controlling a vehicle, a simulated vehicle action, wherein the simulated vehicle action is based at least in part on the object action;
   determining a performance metric associated with the controller based at least in part on the simulated vehicle action; and
   modifying a parameter associated with the controller based at least in part on the performance metric.

7. The method as claim 6 recites, wherein the initialization parameter comprises at least one of:
   a road condition associated with the simulation;
   a weather condition associated with the simulation;
   an initial position associated with the vehicle;
   an initial position associated with the object;
   a number of objects present in the simulation;
   an object density associated with the simulation; or
   an amount of acceleration, yaw, or speed to associate with the simulation.

8. The method as claim 6 recites, wherein the object is an adversarial object of an adversarial network, the method further comprising:
   determining an objective of the adversarial object;
   determining that the object action satisfies the objective;
   determining a reward based at least in part on determining that the object action satisfies the objective; and
   training the adversarial network based at least in part on the reward.

9. The method as claim 6 recites, wherein the performance metric is based at least in part on at least one of:
   a safety cost associated with the simulated vehicle action based at least in part on a minimum distance between the vehicle and the object in the simulation;

a comfort cost associated with the simulated vehicle action based at least in part on at least one of an acceleration associated with the simulated vehicle action or the minimum distance between the vehicle and the object;

a progress cost associated with the simulated vehicle action based at least in part on a calculated delay in the vehicle reaching a destination; or an operational rules cost associated with the simulated vehicle action based at least in part on one or more rules associated with vehicular travel in an environment.

10. The method as claim 6 recites, the method further comprising:

receiving an object parameter associated with the object, wherein the object parameter comprises at least one of a maximum velocity or a maximum acceleration of the object;

determining that the first input exceeds the at least one of the maximum velocity or the maximum acceleration of the object; and mapping the object action to the at least one of the maximum velocity or the maximum acceleration of the object.

11. The method as claim 6 recites, wherein the controller is trained utilizing machine learning techniques comprising reinforcement learning.

12. The method as claim 6 recites, wherein a modification to the parameter of the controller generates a modified controller, the method further comprising:

receiving a second input associated with a second object action of the object;

receiving, from the modified controller, a second simulated vehicle action, wherein the second simulated vehicle action is based at least in part on the second object action; and determining a second performance metric associated with the second simulated vehicle action.

13. The method as claim 12 recites, further comprising:

determining that the second performance metric exceeds a performance threshold associated with a function; and validating performance of the modified controller based at least in part on determining that the second performance metric exceeds the performance threshold.

14. The method as claim 6 recites, further comprising:

determining an object goal associated with an operation of the object in the simulation;

determining that the object action satisfies the object goal; and training a computing system configured to control one or more objects to bias toward the object action based at least in part on the object action satisfying the object goal.

15. A non-transitory computer-readable medium storing instructions that, when executed, cause one or more processors to perform operations comprising:

generating a simulation based at least in part on an initialization parameter;

receiving a first input associated with an object action, wherein the first input comprises a user-generated input received via a user interface;

receiving, from a controller configured for controlling a vehicle, a simulated vehicle action, wherein the simulated vehicle action is based at least in part on the object action;

determining a performance metric associated with the controller based at least in part on the simulated vehicle action; and modifying a parameter associated with the controller based at least in part on the performance metric.

16. The non-transitory computer-readable medium of claim 15, wherein the vehicle is a first vehicle, the operations further comprising;

receiving, via an instance of the user interface configured for controlling a second vehicle, a second input associated with a second simulated vehicle action of the second vehicle;

determining a second performance metric associated with the second simulated vehicle action; and training the controller based at least in part on the second performance metric.

17. The non-transitory computer-readable medium of claim 15, wherein the controller is trained utilizing machine learning techniques comprising reinforcement learning.

18. The non-transitory computer-readable medium of claim 15, the operations further comprising:

determining a second performance metric associated with a modified controller;

determining that the second performance metric exceeds a performance threshold associated with a function; and validating performance of the modified controller based at least in part on determining that the second performance metric exceeds the performance threshold.

19. The non-transitory computer-readable medium of claim 15, wherein the performance metric is based at least in part on at least one of:

a safety cost associated with the simulated vehicle action, wherein the safety cost is based at least in part on a minimum distance between the vehicle and an object in the simulation or a difference in velocity between a vehicle trajectory and an object trajectory;

a comfort cost associated with the simulated vehicle action, wherein the comfort cost is based at least in part on at least one of:

the minimum distance between the vehicle and the object;

a lateral acceleration associated with the simulated vehicle action; or a longitudinal acceleration associated with the simulated vehicle action;

a progress cost associated with the simulated vehicle action, wherein the progress cost is based at least in part on a delay in reaching a destination associated with the simulated vehicle action; or an operational rules cost, wherein the operational rules cost is based at least in part on a law or a regulation associated with vehicular operation.

20. The non-transitory computer-readable medium of claim 15, wherein an object is an adversarial object associated with an adversarial network and wherein the operations further comprise:

determining an objective associated with the object action;

determining a reward based at least in part on the objective; and training the adversarial network based at least in part on the reward.

* * * * *